US 8,437,545 B1
May 7, 2013

(12) United States Patent
Maxwell et al.

(54) SYSTEM AND METHOD FOR DIGITAL IMAGE SIGNAL COMPRESSION USING INTRINSIC IMAGES

(75) Inventors: Bruce Allen Maxwell, Benton, ME (US); Casey Arthur Smith, Grand Junction, CO (US); Richard Mark Friedhoff, San Francisco, CA (US)

(73) Assignee: Tandent Vision Science, Inc., San Francisco, CA (US)

( * ) Notice: Subject to any disclaimer, the term of this patent is extended or adjusted under 35 U.S.C. 154(b) by 0 days.

(21) Appl. No.: 13/449,469

(22) Filed: Apr. 18, 2012

(51) Int. Cl.
*G06K 9/36* (2006.01)
(52) U.S. Cl. .......................................... 382/166; 382/232
(58) Field of Classification Search ................... 382/100, 382/166, 232
See application file for complete search history.

(56) References Cited

U.S. PATENT DOCUMENTS

| 7,194,128 | B1 * | 3/2007 | Payton | 382/166 |
| 7,596,266 | B2 * | 9/2009 | Maxwell et al. | 382/167 |
| 7,672,530 | B2 | 3/2010 | Friedhoff et al. | 382/266 |
| 7,873,219 | B2 | 1/2011 | Friedhoff et al. | 382/199 |
| 7,894,662 | B2 | 2/2011 | Bushell et al. | 382/154 |
| 2004/0258301 | A1 * | 12/2004 | Payton | 382/166 |
| 2006/0177137 | A1 * | 8/2006 | Friedhoff | 382/199 |
| 2010/0142825 | A1 | 6/2010 | Maxwell et al. | 382/199 |
| 2010/0278448 | A1 | 11/2010 | Friedhoff et al. | 382/274 |
| 2011/0064263 | A1 | 3/2011 | De Haan et al. | 382/100 |

* cited by examiner

*Primary Examiner* — Shefali Goradia
(74) *Attorney, Agent, or Firm* — Davidson, Davidson & Kappel, LLC; Felix. L. D'Arienzo, Jr.

(57) ABSTRACT

In a first exemplary embodiment of the present invention, an automated, computerized method is provided for processing an image. According to a feature of the present invention, the method comprises the steps of providing an image file depicting an image, in a computer memory, generating an approximate intrinsic estimate representation of the image as an intrinsic image corresponding to the image, and compressing the intrinsic image to provide a compressed intrinsic image.

6 Claims, 20 Drawing Sheets

Overview of Compression Process

Figure 2: Pixel Array for Storing Image Data

| P(1, 1) | P(1, 2) | ... | P(1, M) |
| P(2, 1) | P(2, 2) | | |
| P(3, 1) | P(3, 2) | | |
| ... | | | ... |
| P(N, 1) | ... | | P(N, M) |

Image File 18

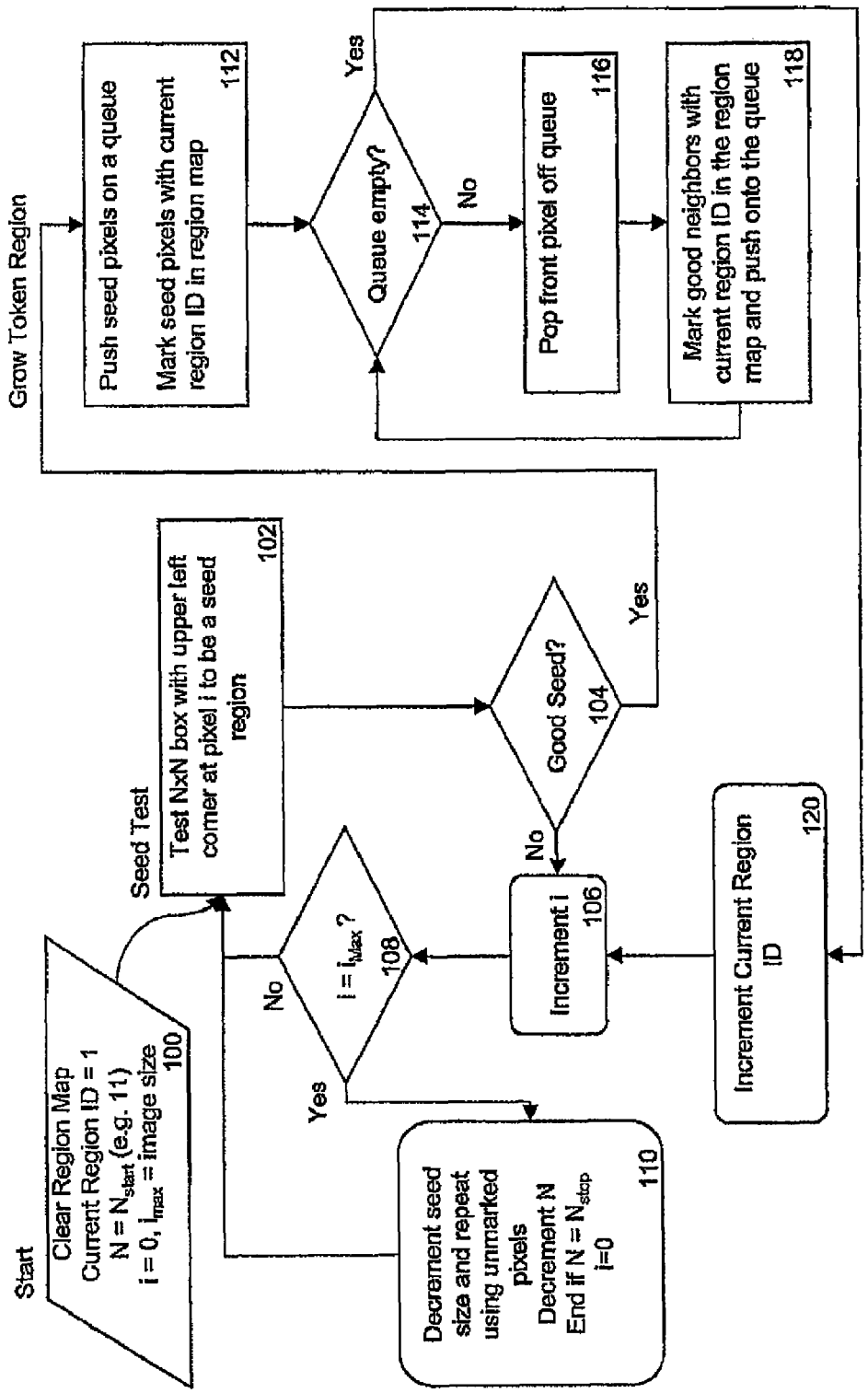
Figure 3A: Identifying Token Regions in an Image

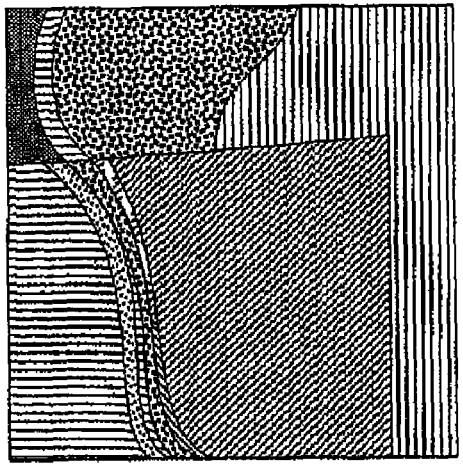
Figure 3C: Token Regions
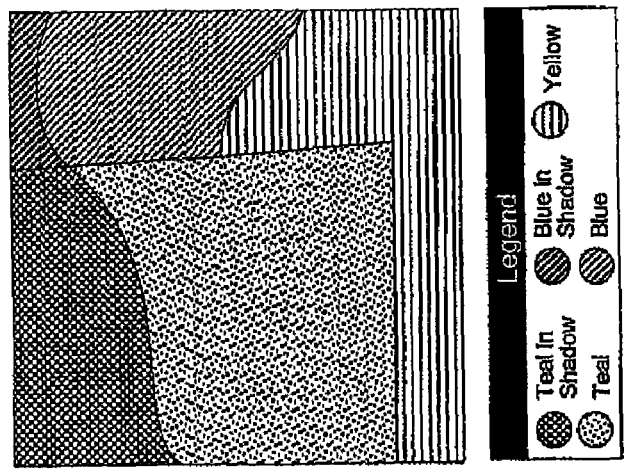
Figure 3B: Original Image
Figure 3B, 3C: Examples of Identifying Token Regions in an Image

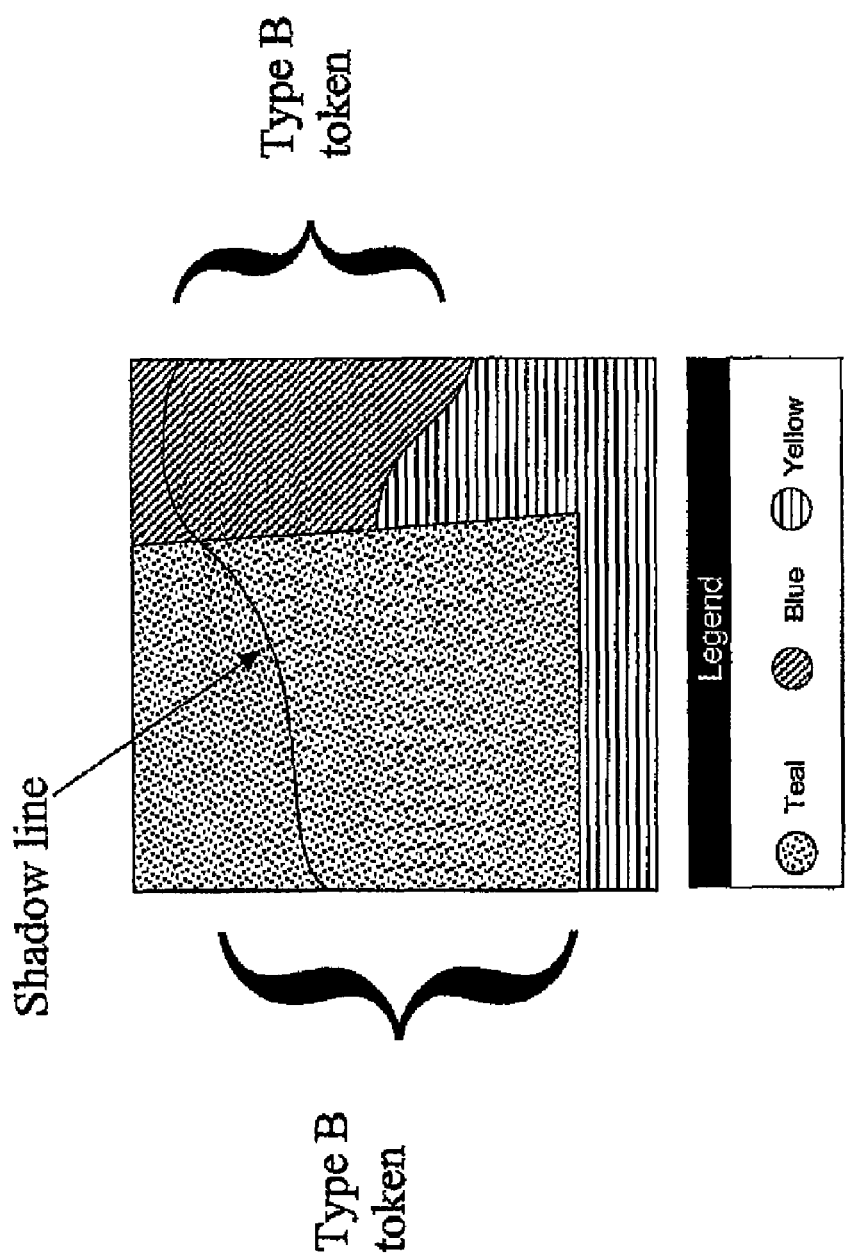
Figure 3D: Type B Tokens

Figure 5: Log Color Space Chromaticity Plane

N = Log Space Chromaticity Plane Normal

Figure 6: Selecting colors from an image

Figure 7: Determining the log chromaticity orientation

Figure 8: Determining log chromaticity coordinates

Figure 9: Optionally augmenting log chromaticity coordinates

Figure 10: Clustering log chromaticity coordinates

Figure 11: Assigning coordinates to clusters

Figure 12: Detecting regions of uniform reflectance based on log chromaticity clustering $$\begin{bmatrix} 1 & -1 & 0 \\ 1 & 0 & -1 \\ 0 & 1 & -1 \end{bmatrix} \begin{bmatrix} i_a \\ i_b \\ i_c \end{bmatrix} = \begin{bmatrix} i_a - i_b \\ i_a - i_c \\ i_b - i_c \end{bmatrix}$$

[A]      [x] =    [b]

SYSTEM AND METHOD FOR DIGITAL IMAGE SIGNAL COMPRESSION USING INTRINSIC IMAGES

BACKGROUND OF THE INVENTION

Many significant and commercially important uses of modern computer technology relate to images. These include image processing, image analysis and computer vision applications. In computer vision applications, such as, for example, object recognition and optical character recognition, it has been found that a separation of illumination and material aspects of an image can significantly improve the accuracy and speed of computer performance. Significant pioneer inventions related to the illumination and material aspects of an image are disclosed in U.S. Pat. No. 7,873,219 to Richard Mark Friedhoff, entitled Differentiation Of Illumination And Reflection Boundaries and U.S. Pat. No. 7,672,530 to Richard Mark Friedhoff et al., entitled Method And System For Identifying Illumination Flux In An Image (hereinafter the Friedhoff patents).

SUMMARY OF THE INVENTION

The present invention provides an improvement and enhancement to the fundamental teachings of the Friedhoff patents, and includes a method and system comprising image techniques that accurately and correctly generate intrinsic images that can be applied in a digital image signal compression algorithm, for improved results in, for example, data transmission.

In a first exemplary embodiment of the present invention, an automated, computerized method is provided for processing an image. According to a feature of the present invention, the method comprises the steps of providing an image file depicting an image, in a computer memory, generating an estimate intrinsic representation of the image as an intrinsic image corresponding to the image, and compressing the intrinsic image to provide a compressed intrinsic image.

According to an additional feature of the first exemplary embodiment of the present invention, the estimate intrinsic representation comprises an illumination invariant, log chromaticity representation of the image.

In a second exemplary embodiment of the present invention, a device is provided. The device comprise a computer system arranged and configured to execute a routine to access an image file depicting an image, in a computer memory, generate an approximate intrinsic estimate representation of the image as an intrinsic image corresponding to the image, compress the intrinsic image to provide a compressed intrinsic image, and output the compressed intrinsic image.

In a third exemplary embodiment of the present invention, a computer program product, disposed on a non-transient computer readable media is provided. The computer program product includes computer executable process steps operable to control a computer to access an image file depicting an image, in a computer memory, generate an approximate intrinsic estimate representation of the image as an intrinsic image corresponding to the image, compress the intrinsic image to provide a compressed intrinsic image, and output the compressed intrinsic image.

In a fourth exemplary embodiment of the present invention, a device is provided. The device comprise a computer system arranged and configured to receive a compressed intrinsic image and to decompress the compressed intrinsic image to an approximate intrinsic estimate representation of the image.

In accordance with yet further embodiments of the present invention, computer systems are provided, which include one or more computers configured (e.g., programmed) to perform the methods described above. In accordance with other embodiments of the present invention, non-transitory computer readable media are provided which have stored thereon computer executable process steps operable to control a computer(s) to implement the embodiments described above. The present invention contemplates a computer readable media as any product that embodies information usable in a computer to execute the methods of the present invention, including instructions implemented as a hardware circuit, for example, as in an integrated circuit chip. The automated, computerized methods can be performed by a digital computer, analog computer, optical sensor, state machine, sequencer, integrated chip or any device or apparatus that can be designed or programmed to carry out the steps of the methods of the present invention.

BRIEF DESCRIPTION OF THE DRAWINGS

FIG. 2 shows an n×m pixel array image file for an image stored in the computer system of FIG. 1.

FIG. 3*a* is a flow chart for identifying Type C token regions in the image file of FIG. 2, according to a feature of the present invention.

FIG. 3*b* is an original image used as an example in the identification of Type C tokens.

FIG. 3*c* shows Type C token regions in the image of FIG. 3*b*.

FIG. 3*d* shows Type B tokens, generated from the Type C tokens of FIG. 3*c*, according to a feature of the present invention.

DETAILED DESCRIPTION OF THE PREFERRED EMBODIMENTS

Figure 1:
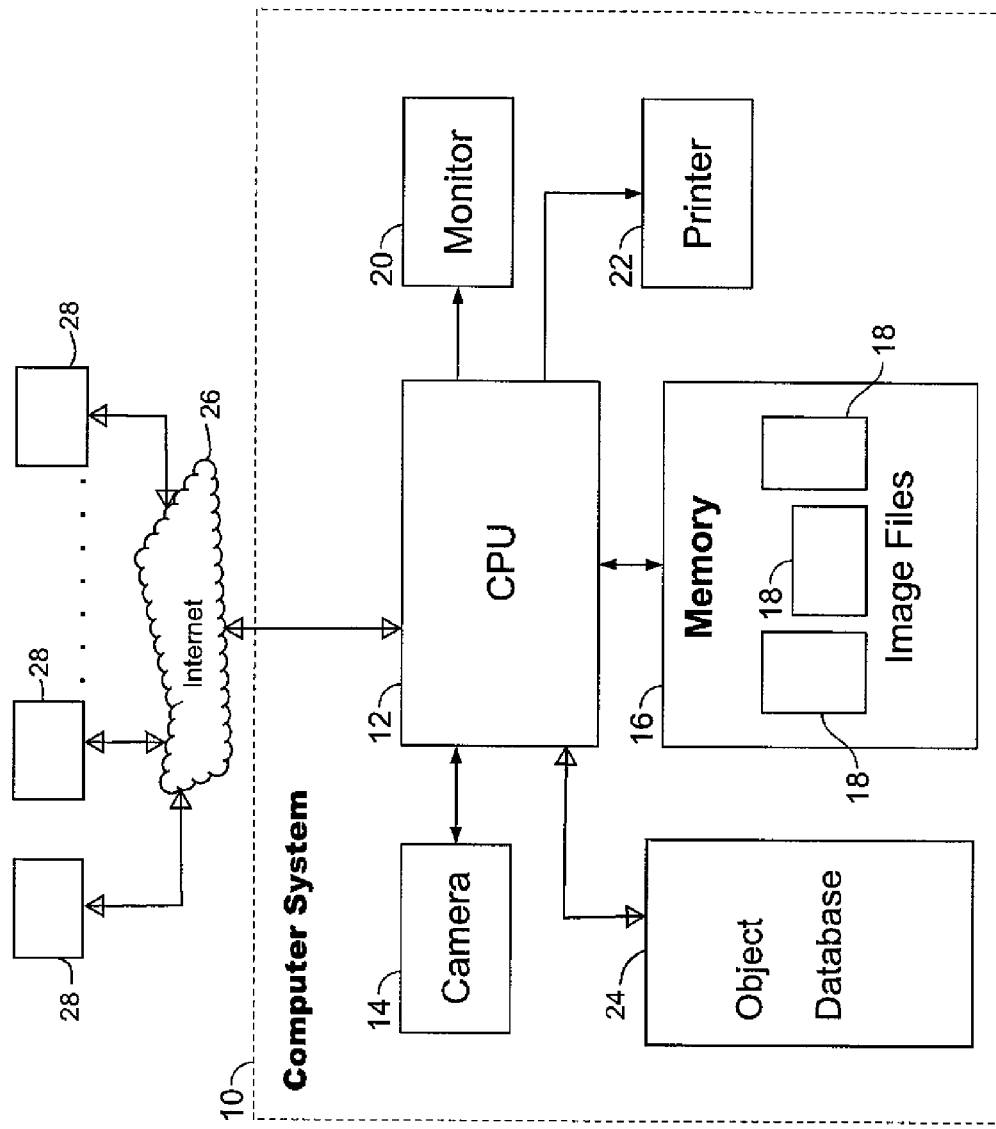
FIG. 1 is a block diagram of a computer system arranged and configured to perform operations related to images.

Referring now to the drawings, and initially to FIG. 1, there is shown a block diagram of a computer system 10 arranged and configured to perform operations related to images. A CPU 12 is coupled to a device such as, for example, a digital camera 14 via, for example, a USB port. The digital camera can comprise a video digital camera. The digital camera 14 operates to download images stored locally on the camera 14, to the CPU 12. The CPU 12 stores the downloaded images in a memory 16 as image files 18. The image files 18 can be accessed by the CPU 12 for display on a monitor 20, or for print out on a printer 22. The memory 16 can comprise any temporary or permanent data storage device.

Moreover, the computer system 10 includes an object database 24 storing information on various objects that can appear in the image files 18 stored in the memory 16. The information includes information on the material make-up and material reflectance colors for each object stored in the database 24. The object database is coupled to the CPU 12, as shown in FIG. 1. The CPU 12 is also coupled to the Internet 26, for access to websites 28. The websites 28 include websites that contain information relevant to objects that can appear in the image files 18, such as, for example, the material make-up and material reflectance colors for the objects, and provide another source for an object database. The websites 28 also include websites that are arranged to receive image file 18, transmitted over the Internet 26, from the CPU 12.

Alternatively, the CPU 12 can be implemented as a microprocessor embedded in a device such as, for example, the digital camera 14 or a robot. The CPU 12 can also be equipped with a real time operating system for real time operations related to images, in connection with, for example, a robotic operation or an interactive operation with a user.

As shown in FIG. 2, each image file 18 comprises an n×m pixel array. Each pixel, p, is a picture element corresponding to a discrete portion of the overall image. All of the pixels together define the image represented by the image file 18. Each pixel comprises a digital value corresponding to a set of color bands, for example, red, green and blue color components (RGB) of the picture element. The present invention is applicable to any multi-band image, where each band corresponds to a piece of the electro-magnetic spectrum. The pixel array includes n rows of m columns each, starting with the pixel $p(1,1)$ and ending with the pixel $p(n, m)$. When displaying or printing an image, the CPU 12 retrieves the corresponding image file 18 from the memory 16, and operates the monitor 20 or printer 22, as the case may be, as a function of the digital values of the pixels in the image file 18, as is generally known.

In an image operation, the CPU 12 operates to analyze the RGB values of the pixels of a stored image file 18 to achieve various objectives, such as, for example, to identify regions of an image that correspond to a single material depicted in a scene recorded in the image file 18. A fundamental observation underlying a basic discovery of the present invention, is that an image comprises two components, material and illumination. All changes in an image are caused by one or the other of these components. A method for detecting of one of these components, for example, material, provides a mechanism for distinguishing material or object geometry, such as object edges, from illumination and shadow boundaries.

Such a mechanism enables techniques that can be used to generate intrinsic images. The intrinsic images correspond to an original image, for example, an image depicted in an input image file 18. The intrinsic images include, for example, an illumination image, to capture the intensity and color of light incident upon each point on the surfaces depicted in the image, and a material reflectance image, to capture reflectance properties of surfaces depicted in the image (the percentage of each wavelength of light a surface reflects). The separation of illumination from material in the intrinsic images provides the CPU 12 with images optimized for more effective and accurate and efficient further processing.

For example, according to a feature of the present invention, the intrinsic images are applied in a digital image signal compression algorithm, for improved results in data transmission and/or storage. Computer files that depict an image, particularly a color image, require a significant amount of information arranged as, for example, pixels represented by bytes. Thus, each image file requires a significant amount of storage space in a memory, and can consume a large amount of time in a data transmission of the image to a remote site or device. The amount of time that can be required to transmit a sequence of images, for example, as in a video stream, can render an operation, such as a streaming operation for realtime display of a video on a smartphone, Internet website or tablet, unfeasible.

Accordingly, mathematical techniques have been developed to compress the number of bytes representing the pixels of an image to a significantly smaller number of bytes. For example, a .jpg file format is a loosy compression algorithm developed by the Joint Photographic Experts Group (JPEG), for compressing a digital photographic file. The compressed image can be stored in a manner that requires much less storage capacity than the original image file, and transmitted to a remote site or device in a far more efficient and speedy transmission operation. The compressed image file is decompressed for further use, such as, for example, display on a screen. However, due to the rapidly increasing number of users of devices for reception and realtime display of digital videos, known compression techniques are being pressed to the limits of effective functionality.

According to a feature of the present invention, digital signal compression and decompression processing is improved by performing the compression and decompression processes on intrinsic images.

Pursuant to a feature of the present invention, processing is performed at a token level. A token is a connected region of an image wherein the pixels of the region are related to one another in a manner relevant to identification of image features and characteristics such as an identification of materials and illumination. The pixels of a token can be related in terms of either homogeneous factors, such as, for example, close correlation of color among the pixels, or inhomogeneous factors, such as, for example, differing color values related geometrically in a color space such as RGB space, commonly referred to as a texture. The present invention utilizes spatio-spectral information relevant to contiguous pixels of an image depicted in an image file 18 to identify token regions. The spatio-spectral information includes spectral relationships among contiguous pixels, in terms of color bands, for example the RGB values of the pixels, and the spatial extent of the pixel spectral characteristics relevant to a single material.

According to one exemplary embodiment of the present invention, tokens are each classified as either a Type A token, a Type B token or a Type C token. A Type A token is a connected image region comprising contiguous pixels that represent the largest possible region of the image encompassing a single material in the scene (uniform reflectance). A Type B token is a connected image region comprising contiguous pixels that represent a region of the image encompassing a single material in the scene, though not necessarily the maximal region of uniform reflectance corresponding to that material. A Type B token can also be defined as a collection of one or more image regions or pixels, all of which have the same reflectance (material color) though not necessarily all pixels which correspond to that material color. A Type C token comprises a connected image region of similar image properties among the contiguous pixels of the token, where similarity is defined with respect to a noise model for the imaging system used to record the image.

Referring now to FIG. 3a, there is shown a flow chart for identifying Type C token regions in the scene depicted in the image file 18 of FIG. 2, according to a feature of the present invention. Type C tokens can be readily identified in an image, utilizing the steps of FIG. 3a, and then analyzed and processed to construct Type B tokens, according to a feature of the present invention.

A $1^{st}$ order uniform, homogeneous Type C token comprises a single robust color measurement among contiguous pixels of the image. At the start of the identification routine, the CPU 12 sets up a region map in memory. In step 100, the CPU 12 clears the region map and assigns a region ID, which is initially set at 1. An iteration for the routine, corresponding to a pixel number, is set at I=0, and a number for an N×N pixel array, for use as a seed to determine the token, is set an initial value, N=$N_{start}$. $N_{start}$ can be any integer >0, for example it can be set at set at 11 or 15 pixels.

At step 102, a seed test is begun. The CPU 12 selects a first pixel, I=1, pixel (1, 1) for example (see FIG. 2), the pixel at the upper left corner of a first N×N sample of the image file 18. The pixel is then tested in decision block 104 to determine if the selected pixel is part of a good seed. The test can comprise a comparison of the color value of the selected pixel to the color values of a preselected number of its neighboring pixels as the seed, for example, the N×N array. The color values comparison can be with respect to multiple color band values (RGB in our example) of the pixel. If the comparison does not result in approximately equal values (within the noise levels of the recording device) for the pixels in the seed, the CPU 12 increments the value of I (step 106), for example, I=2, pixel (1, 2), for a next N×N seed sample, and then tests to determine if I=$i_{max}$ (decision block 108).

If the pixel value is at $i_{max}$, a value selected as a threshold for deciding to reduce the seed size for improved results, the seed size, N, is reduced (step 110), for example, from N=15 to N=12. In an exemplary embodiment of the present invention, $i_{max}$ can be set at a number of pixels in an image ending at pixel (n, m), as shown in FIG. 2. In this manner, the routine of FIG. 3a parses the entire image at a first value of N before repeating the routine for a reduced value of N.

After reduction of the seed size, the routine returns to step 102, and continues to test for token seeds. An $N_{stop}$ value (for example, N=2) is also checked in step 110 to determine if the analysis is complete. If the value of N is at $N_{stop}$, the CPU 12 has completed a survey of the image pixel arrays and exits the routine.

If the value of I is less than $i_{max}$, and N is greater than $N_{stop}$, the routine returns to step 102, and continues to test for token seeds.

When a good seed (an N×N array with approximately equal pixel values) is found (block 104), the token is grown from the seed. In step 112, the CPU 12 pushes the pixels from the seed onto a queue. All of the pixels in the queue are marked with the current region ID in the region map. The CPU 12 then inquires as to whether the queue is empty (decision block 114). If the queue is not empty, the routine proceeds to step 116.

In step 116, the CPU 12 pops the front pixel off the queue and proceeds to step 118. In step 118, the CPU 12 marks "good" neighbors around the subject pixel, that is neighbors approximately equal in color value to the subject pixel, with the current region ID. All of the marked good neighbors are placed in the region map and also pushed onto the queue. The CPU 12 then returns to the decision block 114. The routine of steps 114, 116, 118 is repeated until the queue is empty. At that time, all of the pixels forming a token in the current region will have been identified and marked in the region map as a Type C token.

When the queue is empty, the CPU 12 proceeds to step 120. At step 120, the CPU 12 increments the region ID for use with identification of a next token. The CPU 12 then returns to step 106 to repeat the routine in respect of the new current token region.

Upon arrival at N=$N_{stop}$, step 110 of the flow chart of FIG. 3a, or completion of a region map that coincides with the image, the routine will have completed the token building task. FIG. 3b is an original image used as an example in the identification of tokens. The image shows areas of the color blue and the blue in shadow, and of the color teal and the teal in shadow. FIG. 3c shows token regions corresponding to the region map, for example, as identified through execution of the routine of FIG. 3a (Type C tokens), in respect to the image of FIG. 3b. The token regions are color coded to illustrate the token makeup of the image of FIG. 3b, including penumbra regions between the full color blue and teal areas of the image and the shadow of the colored areas.

While each Type C token comprises a region of the image having a single robust color measurement among contiguous pixels of the image, the token may grow across material boundaries. Typically, different materials connect together in one Type C token via a neck region often located on shadow boundaries or in areas with varying illumination crossing different materials with similar hue but different intensities. A neck pixel can be identified by examining characteristics of adjacent pixels. When a pixel has two contiguous pixels on opposite sides that are not within the corresponding token, and two contiguous pixels on opposite sides that are within the corresponding token, the pixel is defined as a neck pixel.

Figure 4:
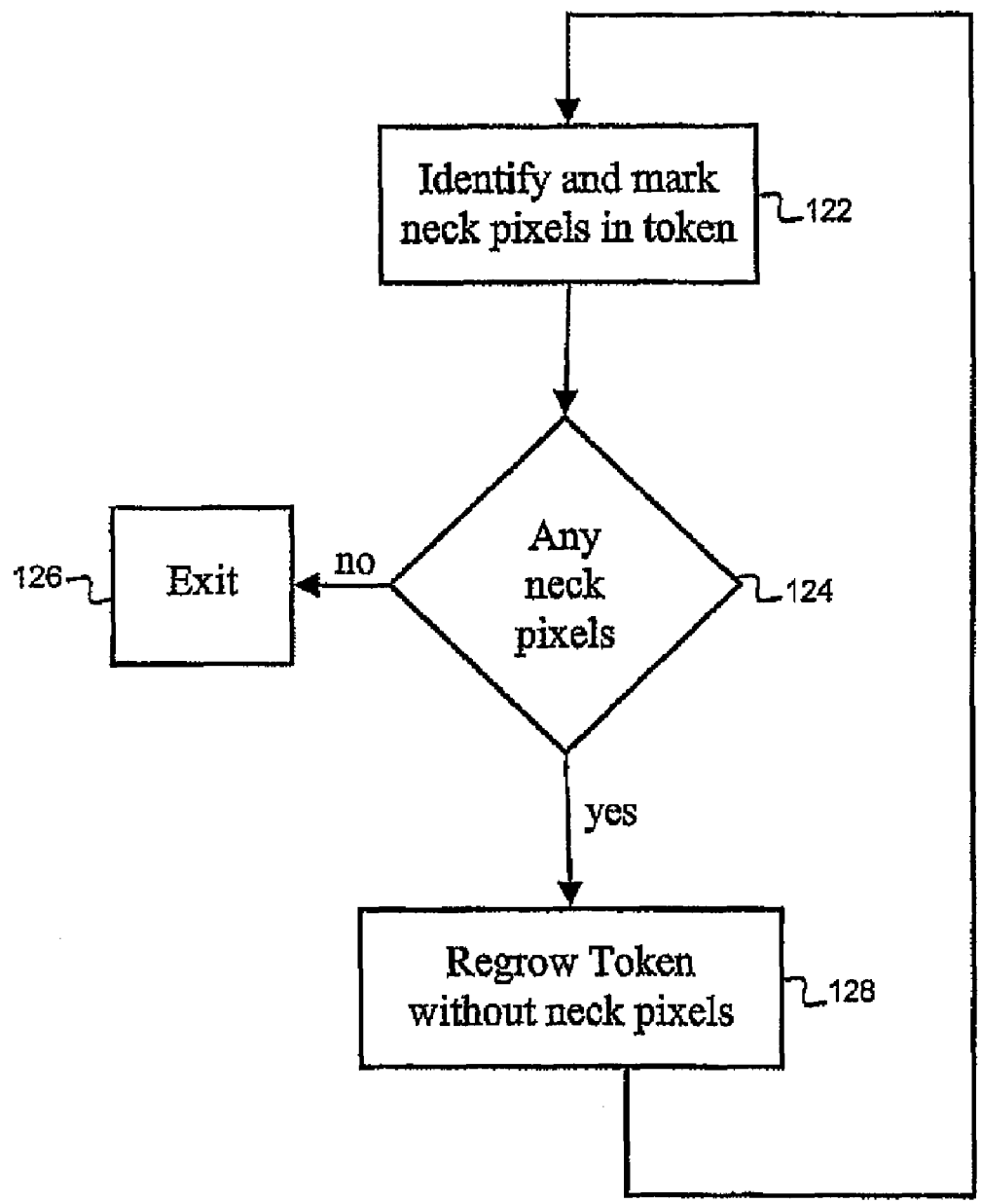
FIG. 4 is a flow chart for a routine to test Type C tokens identified by the routine of the flow chart of FIG. 3*a*, according to a feature of the present invention.

FIG. 4 shows a flow chart for a neck test for Type C tokens. In step 122, the CPU 12 examines each pixel of an identified token to determine whether any of the pixels under examination forms a neck. The routine of FIG. 4 can be executed as a subroutine directly after a particular token is identified during execution of the routine of FIG. 3a. All pixels identified as a neck are marked as "ungrowable." In decision block 124, the CPU 12 determines if any of the pixels were marked.

If no, the CPU 12 exits the routine of FIG. 4 and returns to the routine of FIG. 3a (step 126).

If yes, the CPU 12 proceeds to step 128 and operates to regrow the token from a seed location selected from among the unmarked pixels of the current token, as per the routine of FIG. 3a, without changing the counts for seed size and region ID. During the regrowth process, the CPU 12 does not include any pixel previously marked as ungrowable. After the token is regrown, the previously marked pixels are unmarked so that other tokens may grow into them.

Subsequent to the regrowth of the token without the previously marked pixels, the CPU 12 returns to step 122 to test the newly regrown token. Neck testing identifies Type C tokens that cross material boundaries, and regrows the identified tokens to provide single material Type C tokens suitable for use in creating Type B tokens.

FIG. 3d shows Type B tokens generated from the Type C tokens of FIG. 3c, according to a feature of the present invention. The present invention provides a novel exemplary technique using log chromaticity clustering, for constructing Type B tokens for an image file 18. Log chromaticity is a technique for developing an illumination invariant chromaticity space.

A method and system for separating illumination and reflectance using a log chromaticity representation is disclosed in U.S. Pat. No. 7,596,266, which is hereby expressly incorporated by reference. The techniques taught in U.S. Pat. No. 7,596,266 can be used to provide illumination invariant log chromaticity representation values for each color of an image, for example, as represented by Type C tokens. Logarithmic values of the color band values of the image pixels are plotted on a log-color space graph. The logarithmic values are then projected to a log-chromaticity projection plane oriented as a function of a bi-illuminant dichromatic reflection model (BIDR model), to provide a log chromaticity value for each pixel, as taught in U.S. Pat. No. 7,596,266. The BIDR Model predicts that differing color measurement values fall within a cylinder in RGB space, from a dark end (in shadow) to a bright end (lit end), along a positive slope, when the color change is due to an illumination change forming a shadow over a single material of a scene depicted in the image.

Figure 5:
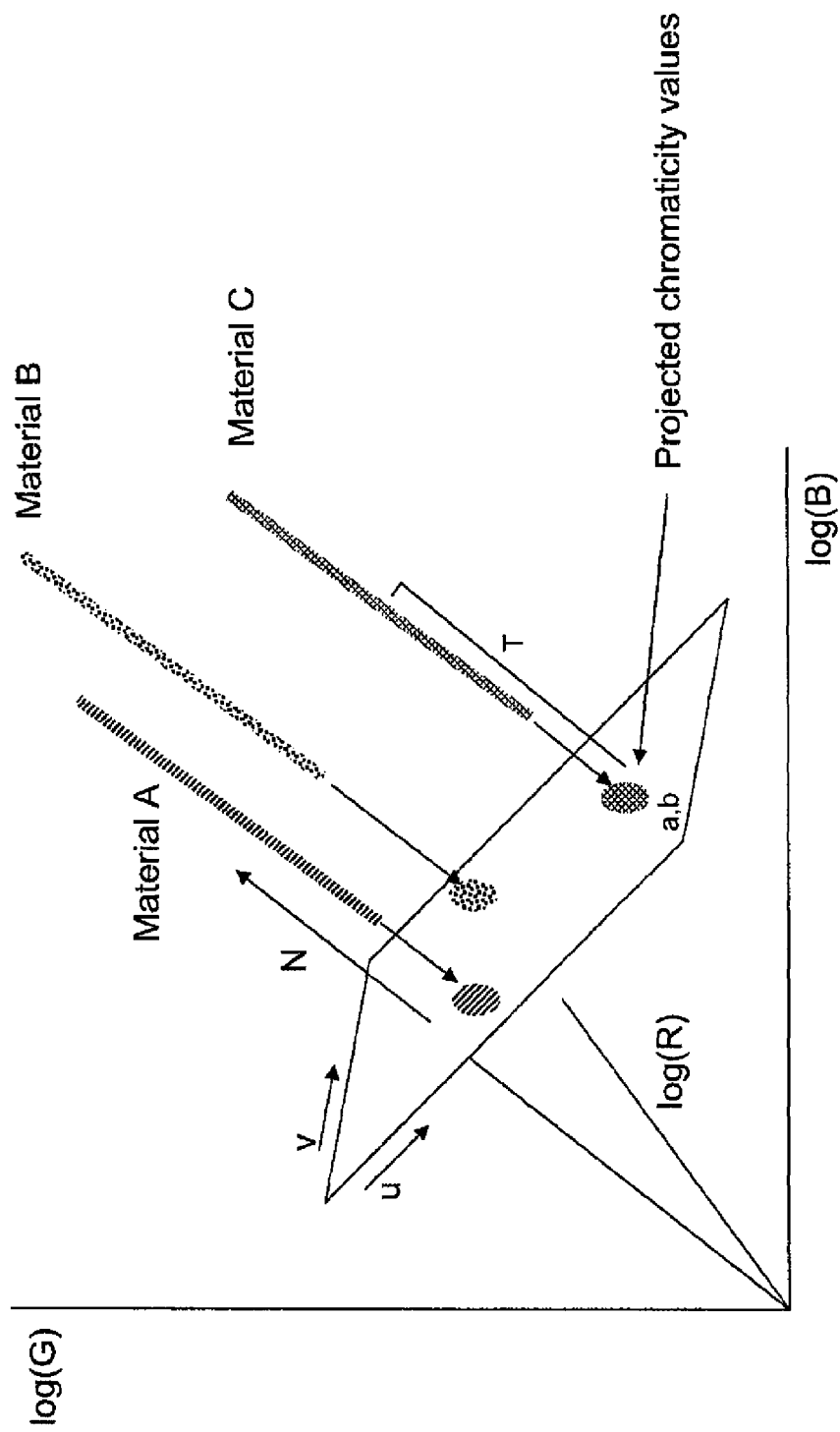
FIG. 5 is a graphic representation of a log color space chromaticity plane according to a feature of the present invention.

FIG. 5 is a graphic representation of a log color space, bi-illuminant chromaticity plane according to a feature of the invention disclosed in U.S. Pat. No. 7,596,266. The alignment of the chromaticity plane is determined by a vector N, normal to the chromaticity plane, and defined as N=log (Bright$_{vector}$)−log(Dark$_{vector}$)=log(1+1/S$_{vector}$). The co-ordinates of the plane, u, v can be defined by a projection of the green axis onto the chromaticity plane as the u axis, and the cross product of u and N being defined as the v axis. In our example, each log value for the materials A, B, C is projected onto the chromaticity plane, and will therefore have a corresponding u, v co-ordinate value in the plane that is a chromaticity value, as shown in FIG. 5.

Thus, according to the technique disclosed in U.S. Pat. No. 7,596,266, the RGB values of each pixel in an image file 18 can be mapped by the CPU 12 from the image file value p(n, m, R, G, B) to a log value, then, through a projection to the chromaticity plane, to the corresponding u, v value, as shown in FIG. 5. Each pixel p(n, m, R, G, B) in the image file 18 is then replaced by the CPU 12 by a two dimensional chromaticity value: p(n, m, u, v), to provide a chromaticity representation of the original RGB image. In general, for an N band image, the N color values are replaced by N−1 chromaticity values. The chromaticity representation is a truly accurate illumination invariant representation because the BIDR model upon which the representation is based, accurately and correctly represents the illumination flux that caused the original image.

According to a feature of the present invention, log chromaticity values are calculated for each color depicted in an image file 18 input to the CPU 12 for identification of regions of the uniform reflectance (Type B tokens). For example, each pixel of a Type C token will be of approximately the same color value, for example, in terms of RGB values, as all the other constituent pixels of the same Type C token, within the noise level of the equipment used to record the image. Thus, an average of the color values for the constituent pixels of each particular Type C token can be used to represent the color value for the respective Type C token in the log chromaticity analysis.

Figure 6:
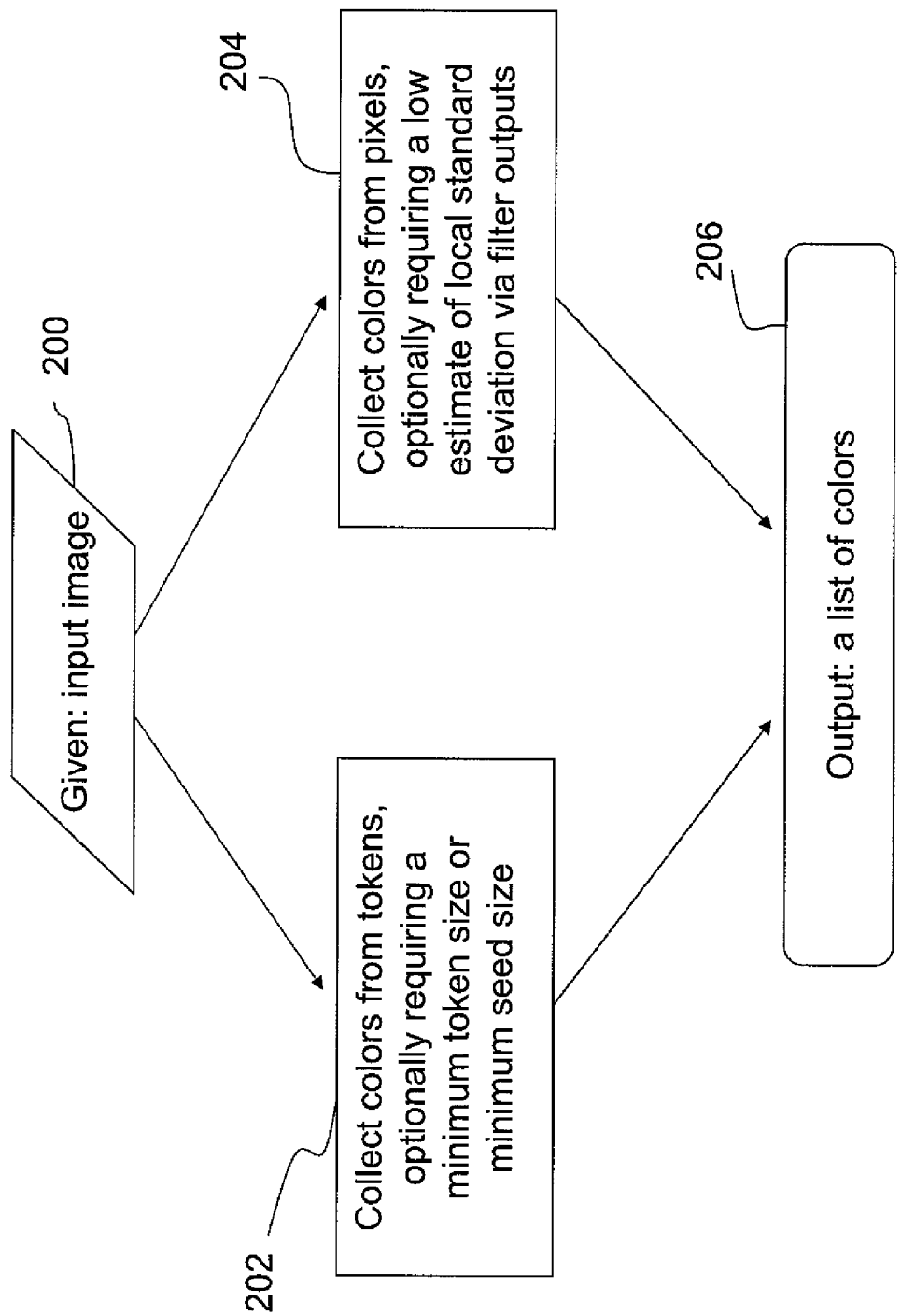
FIG. 6 is a flow chart for determining a list of colors depicted in an input image.

FIG. 6 is a flow chart for determining a list of colors depicted in an input image, for example, an image file 18. In step 200, an input image file 18 is input to the CPU 12 for processing. In steps 202 and 204, the CPU 12 determines the colors depicted in the input image file 18. In step 202, the CPU 12 calculates an average color for each Type C token determined by the CPU 12 through execution of the routine of FIG. 3a, as described above, for a list of colors. The CPU 12 can be operated to optionally require a minimum token size, in terms of the number of constituent pixels of the token, or a minimum seed size (the N×N array) used to determine Type C tokens according to the routine of FIG. 3a, for the analysis. The minimum size requirements are implemented to assure that color measurements in the list of colors for the image are an accurate depiction of color in a scene depicted in the input image, and not an artifact of blend pixels.

Blend pixels are pixels between two differently colored regions of an image. If the colors between the two regions are plotted in RGB space, there is a linear transition between the colors, with each blend pixel, moving from one region to the next, being a weighted average of the colors of the two regions. Thus, each blend pixel does not represent a true color of the image. If blend pixels are present, relatively small Type C tokens, consisting of blend pixels, can be identified for areas of an image between two differently colored regions. By requiring a size minimum, the CPU 12 can eliminate tokens consisting of blend pixel from the analysis.

In step 204, the CPU 12 can alternatively collect colors at the pixel level, that is, the RGB values of the pixels of the input image file 18, as shown in FIG. 2. The CPU 12 can be operated to optionally require each pixel of the image file 18 used in the analysis to have a minimum stability or local standard deviation via a filter output, for a more accurate list of colors. For example, second derivative energy can be used to indicate the stability of pixels of an image.

In this approach, the CPU 12 calculates a second derivative at each pixel, or a subset of pixels disbursed across the image to cover all illumination conditions of the image depicted in an input image file 18, using a Difference of Gaussians, Laplacian of Gaussian, or similar filter. The second derivative energy for each pixel examined can then be calculated by the CPU 12 as the average of the absolute value of the second derivative in each color band (or the absolute value of the single value in a grayscale image), the sum of squares of the values of the second derivatives in each color band (or the square of the single value in a grayscale image), the maximum squared second derivative value across the color bands (or the square of the single value in a grayscale image), or any similar method. Upon the calculation of the second derivative energy for each of the pixels, the CPU 12 analyzes the energy values of the pixels. There is an inverse relationship between second derivative energy and pixel stability, the higher the energy, the less stable the corresponding pixel.

In step 206, the CPU 12 outputs a list or lists of color (after executing one or both of steps 202 and/or 204). According to a feature of the present invention, all of the further processing can be executed using the list from either step 202 or 204, or vary the list used (one or the other of the lists from steps 202 or 204) at each subsequent step.

Figure 7:
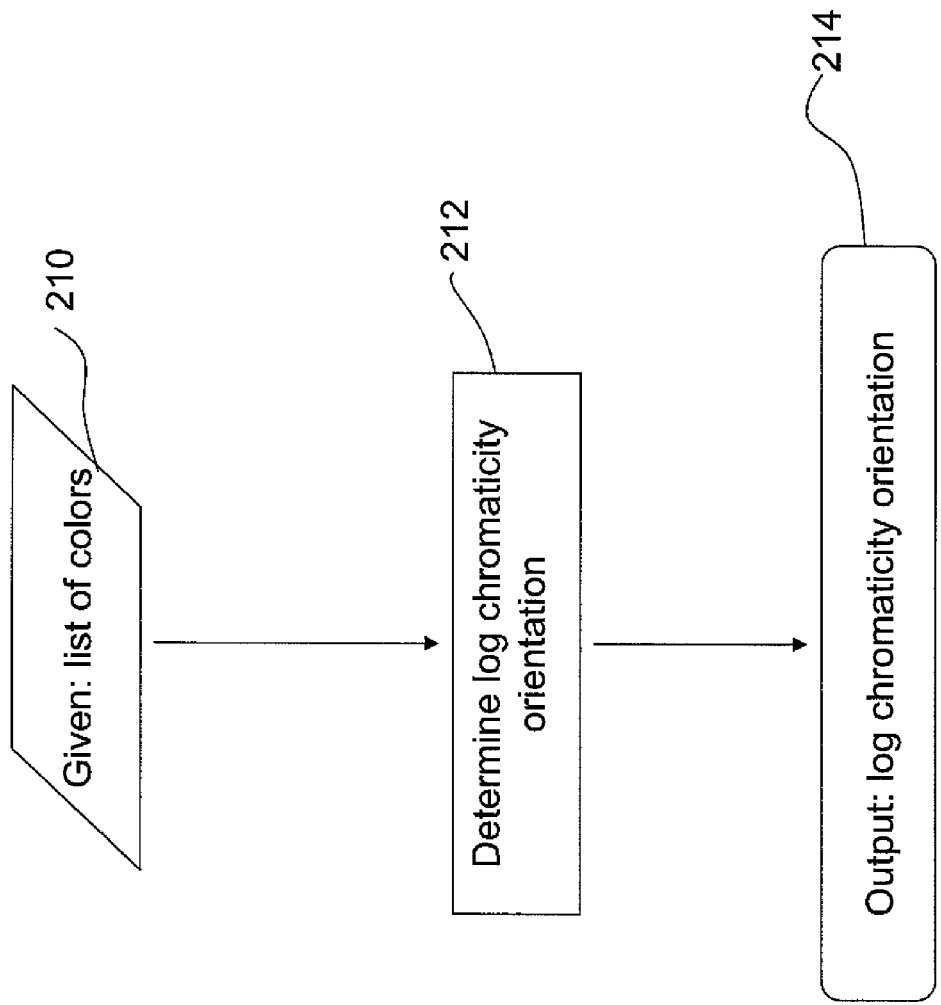
FIG. 7 is a flow chart for determining an orientation for a log chromaticity space, according to a feature of the present invention.

FIG. 7 is a flow chart for determining an orientation for a log chromaticity representation, according to a feature of the present invention. For example, the CPU 12 determines an orientation for the normal N, for a log chromaticity plane, as shown in FIG. 5. In step 210, the CPU 12 receives a list of colors for an input file 18, such as a list output in step 206 of the routine of FIG. 6. In step 212, the CPU 12 determines an orientation for a log chromaticity space.

As taught in U.S. Pat. No. 7,596,266, and as noted above, alignment of the chromaticity plane is represented by N, N being a vector normal to the chromaticity representation, for example, the chromaticity plane of FIG. 5. The orientation is estimated by the CPU 12 thorough execution of any one of several techniques. For example, the CPU 12 can determine estimates based upon entropy minimization, manual selection by a user or the use of a characteristic spectral ratio for an image of an input image file 18, as fully disclosed in U.S. Pat. No. 7,596,266.

For a higher dimensional set of colors, for example, an RYGB space (red, yellow, green, blue), the log chromaticity normal, N, defines a sub-space with one less dimension than the input space. Thus, in the four dimensional RYGB space, the normal N defines a three dimensional log chromaticity space. When the four dimensional RYGB values are projected into the three dimensional log chromaticity space, the projected values within the log chromaticity space are unaffected by illumination variation.

In step 214, the CPU 12 outputs an orientation for the normal N. As illustrated in the example of FIG. 5, the normal N defines an orientation for a u, v plane in a three dimensional RGB space.

Figure 8:
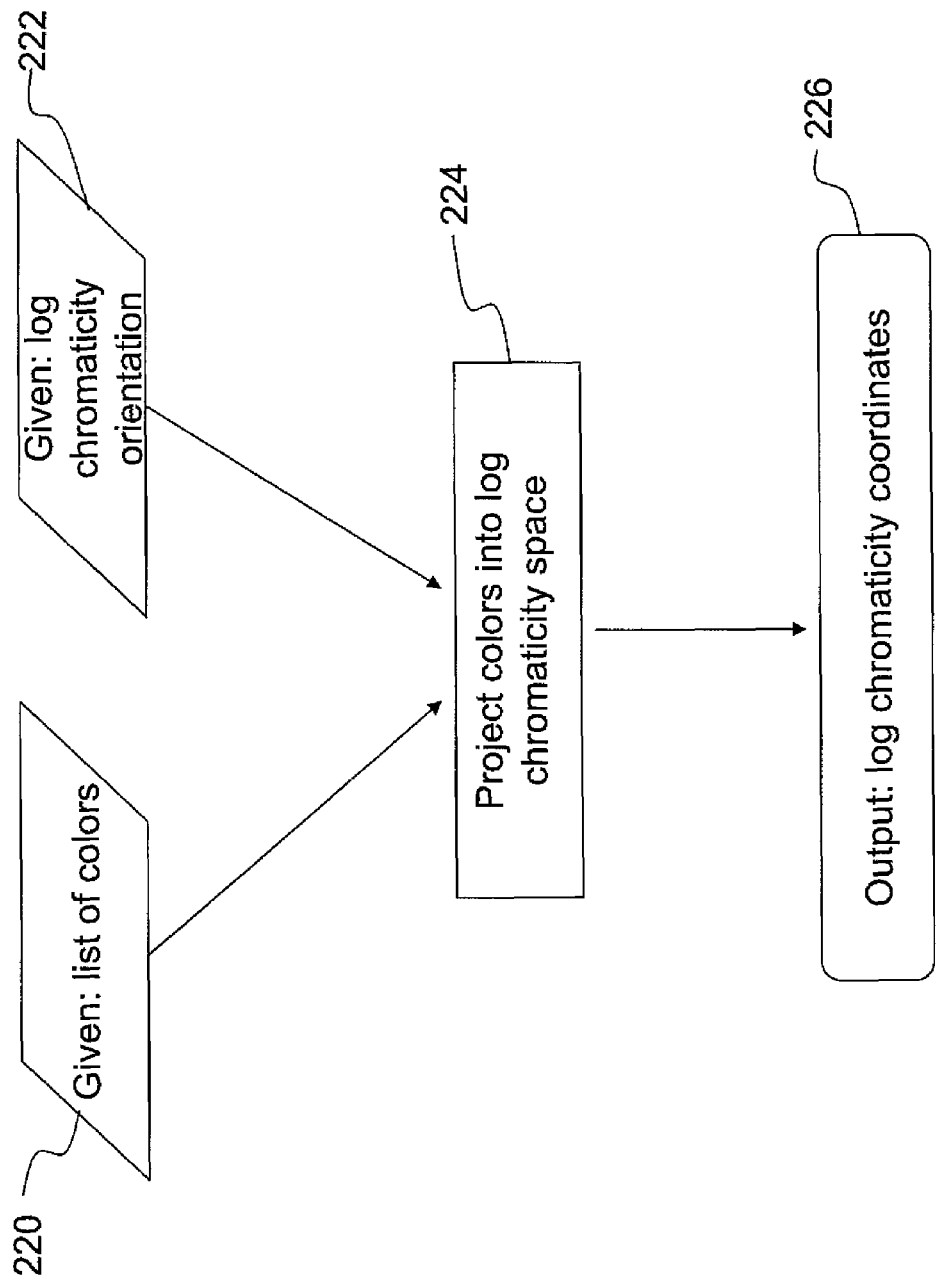
FIG. 8 is a flow chart for determining log chromaticity coordinates for the colors of an input image, as determined through execution of the routine of FIG. 6, according to a feature of the present invention.

FIG. 8 is a flow chart for determining log chromaticity coordinates for the colors of an input image, as identified in steps 202 or 204 of the routine of FIG. 6, according to a feature of the present invention. In step 220, a list of colors is input to the CPU 12. The list of colors can comprise either the list generated through execution of step 202 of the routine of FIG. 6, or the list generated through execution of step 204. In step 222, the log chromaticity orientation for the normal, N, determined through execution of the routine of FIG. 7, is also input to the CPU 12.

In step 224, the CPU 12 operates to calculate a log value for each color in the list of colors and plots the log values in a three dimensional log space at respective (log R, log G, log B) coordinates, as illustrated in FIG. 5. Materials A, B and C denote log values for specific colors from the list of colors input to the CPU 12 in step 220. A log chromaticity plane is also calculated by the CPU 12, in the three dimensional log space, with u, v coordinates and an orientation set by N, input to the CPU 12 in step 222. Each u, v coordinate in the log chromaticity plane can also be designated by a corresponding (log R, log G, log B) coordinate in the three dimensional log space.

According to a feature of the present invention, the CPU 12 then projects the log values for the colors A, B and C onto the log chromaticity plane to determine a u, v log chromaticity coordinate for each color. Each u, v log chromaticity coordinate can be expressed by the corresponding (log R, log G, log B) coordinate in the three dimensional log space. The CPU 12 outputs a list of the log chromaticity coordinates in step 226. The list cross-references each color to a u, v log chromaticity coordinate and to the pixels (or a Type C tokens) having the respective color (depending upon the list of colors used in the analysis (either step 202 (tokens) or 204 (pixels))).

Figure 9:
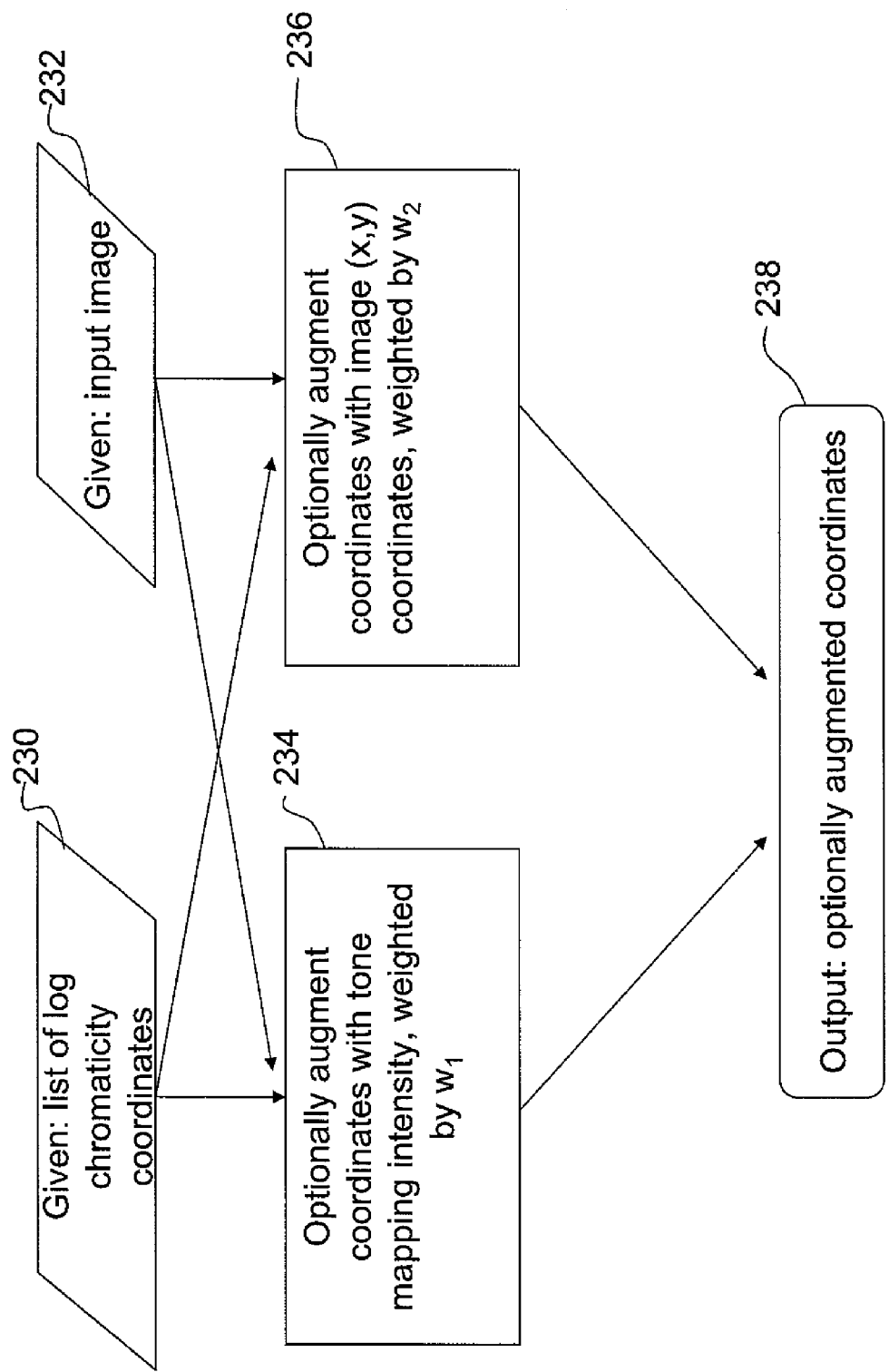
FIG. 9 is a flow chart for augmenting the log chromaticity coordinates, as determined through execution of the routine of FIG. 8, according to a feature of the present invention.

FIG. 9 is a flow chart for optionally augmenting the log chromaticity coordinates for pixels or Type C tokens with extra dimensions, according to a feature of the present invention. In step 230, the list of log chromaticity coordinates, determined for the colors of the input image through execution of the routine of FIG. 8, is input to the CPU 12. In step 232, the CPU 12 accesses the input image file 18, for use in the augmentation.

In step 234, the CPU 12 optionally operates to augment each log chromaticity coordinate with a tone mapping intensity for each corresponding pixel (or Type C token). The tone mapping intensity is determined using any known tone mapping technique. An augmentation with tone mapping intensity information provides a basis for clustering pixels or tokens that are grouped according to both similar log chromaticity coordinates and similar tone mapping intensities. This improves the accuracy of a clustering step.

In step 236, the CPU 12 optionally operates to augment each log chromaticity coordinate with x, y coordinates for the corresponding pixel (or an average of the x, y coordinates for the constituent pixels of a Type C token) (see FIG. 2 showing a P (1,1) to P (N, M) pixel arrangement). Thus, a clustering step with x, y coordinate information will provide groups in a spatially limited arrangement, when that characteristic is desired.

In each of steps 234 and 236, the augmented information can, in each case, be weighted by a factor $w_1$ and $w_2$, $w_3$ respectively, to specify the relative importance and scale of the different dimensions in the augmented coordinates. The weight factors $w_1$ and $w_2$, $w_3$ are user-specified. Accordingly, the (log R, log G, log B) coordinates for a pixel or Type C token is augmented to (log R, log G, log B, $T*w_1$, $x*w_2$, $y*w_3$) where T, x and y are the tone mapped intensity, the x coordinate and the y coordinate, respectively.

In step 238, the CPU 12 outputs a list of the augmented coordinates. The augmented log chromaticity coordinates provide accurate illumination invariant representations of the pixels, or for a specified regional arrangement of an input image, such as, for example, Type C tokens. According to a feature of the present invention, the illumination invariant characteristic of the log chromaticity coordinates is relied upon as a basis to identify regions of an image of a single material or reflectance, such as, for example, Type B tokens.

Figure 10:
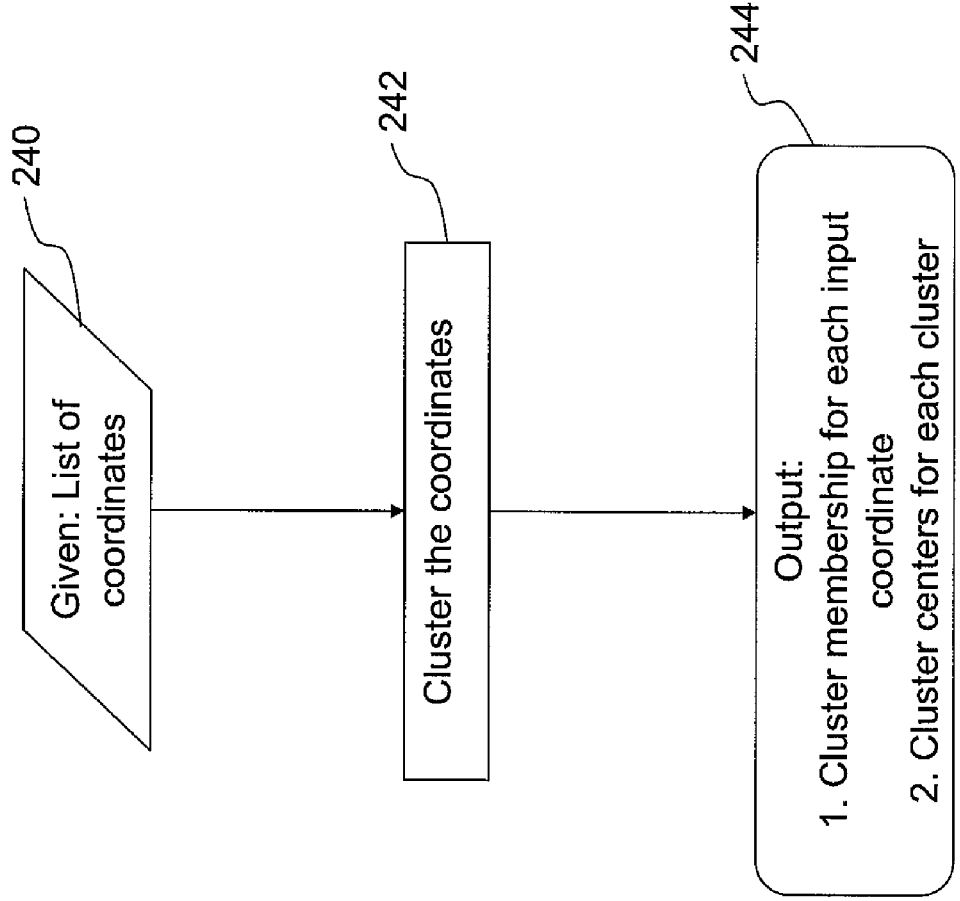
FIG. 10 is a flow chart for clustering the log chromaticity coordinates, according to a feature of the present invention.

FIG. 10 is a flow chart for clustering the log chromaticity coordinates, according to a feature of the present invention. In step 240, the list of augmented log chromaticity coordinates is input the CPU 12. In step 242, the CPU 12 operates to cluster the log chromaticity coordinates. The clustering step can be implemented via, for example, a known k-means clustering. Any known clustering technique can be used to cluster the log chromaticity coordinates to determine groups of similar log chromaticity coordinate values. The CPU 12 correlates each log chromaticity coordinate to the group to which the respective coordinate belongs. The CPU 12 also operates to calculate a center for each group identified in the clustering step. For example, the CPU 12 can determine a center for each group relative to a (log R, log G, log 13, log T) space.

In step 244, the CPU 12 outputs a list of the cluster group memberships for the log chromaticity coordinates (cross referenced to either the corresponding pixels or Type C tokens) and/or a list of cluster group centers.

As noted above, in the execution of the clustering method, the CPU 12 can use the list of colors from either the list generated through execution of step 202 of the routine of FIG. 6, or the list generated through execution of step 204. In applying the identified cluster groups to an input image, the CPU 12 can be operated to use the same set of colors as used in the clustering method (one of the list of colors corresponding to step 202 or to the list of colors corresponding to step 204), or apply a different set of colors (the other of the list of colors corresponding to step 202 or the list of colors corresponding to step 204). If a different set of colors is used, the CPU 12 proceeds to execute the routine of FIG. 11.

Figure 11:
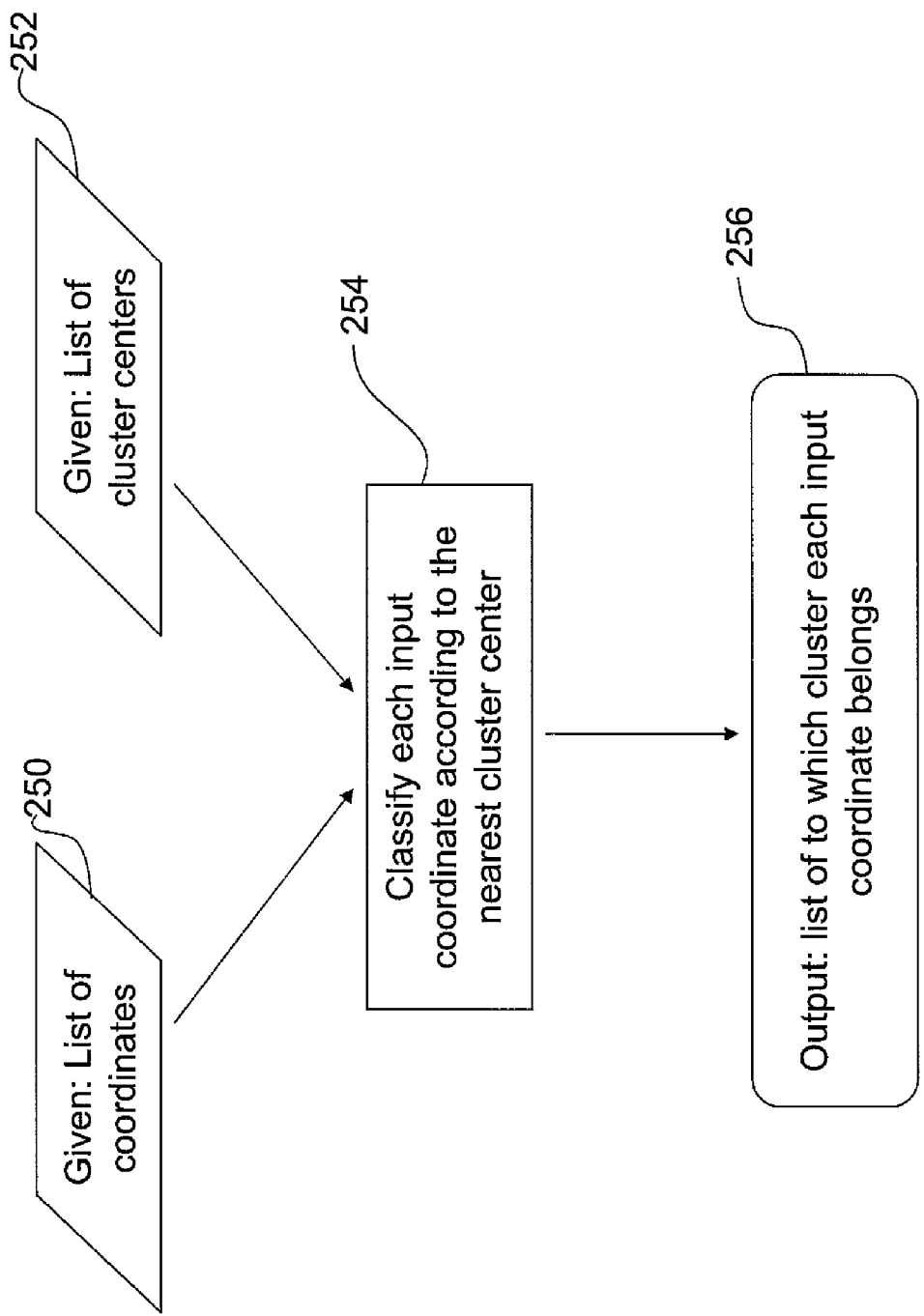
FIG. 11 is a flow chart for assigning the log chromaticity coordinates to clusters determined through execution of the routine of FIG. 10, according to a feature of the present invention.

FIG. 11 is a flow chart for assigning the log chromaticity coordinates to clusters determined through execution of the routine of FIG. 10, when a different list of colors is used after the identification of the cluster groups, according to a feature of the present invention. In step 250, the CPU 12 once again executes the routine of FIG. 8, this time in respect to the new list of colors. For example, if the list of colors generated in step 202 (colors based upon Type C tokens) was used to identify the cluster groups, and the CPU 12 then operates to classify log chromaticity coordinates relative to cluster groups based upon the list of colors generated in step 204 (colors based upon pixels), step 250 of the routine of FIG. 11 is executed to determine the log chromaticity coordinates for the colors of the pixels in the input image file 18.

In step 252, the list of cluster centers is input to the CPU 12. In step 254, the CPU 12 operates to classify each of the log chromaticity coordinates identified in step 250, according to the nearest cluster group center. In step 256, the CPU 12 outputs a list of the cluster group memberships for the log chromaticity coordinates based upon the new list of colors, with a cross reference to either corresponding pixels or Type C tokens, depending upon the list of colors used in step 250 (the list of colors generated in step 202 or the list of colors generated in step 204).

Figure 12:
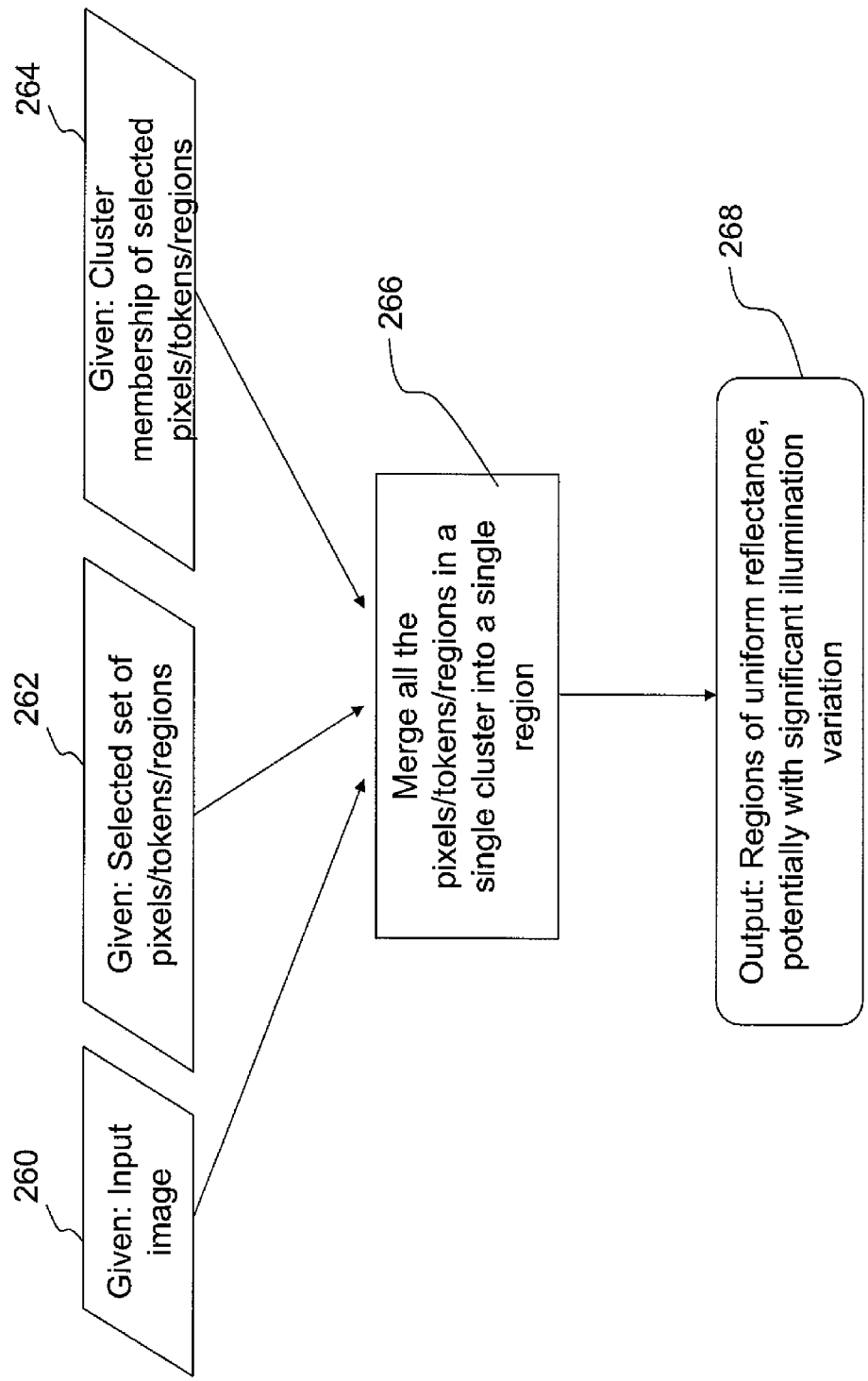
FIG. 12 is a flow chart for detecting regions of uniform reflectance based on the log chromaticity clustering according to a feature of the present invention.

FIG. 12 is a flow chart for detecting regions of uniform reflectance based on the Tog chromaticity clustering according to a feature of the present invention. In step 260, the input image file 18 is once again provided to the CPU 12. In step 262, one of the pixels or Type C tokens, depending upon the list of colors used in step 250, is input to the CPU 12. In step 264, the cluster membership information, form either steps 244 or 256, is input to the CPU 12.

In step 266, the CPU 12 operates to merge each of the pixels, or specified regions of an input image, such as, for example, Type C tokens, having a same cluster group membership into a single region of the image to represent a region of uniform reflectance (Type B token). The CPU 12 performs such a merge operation for all of the pixels or tokens, as the case may be, for the input image file 18. In step 268, the CPU 12 outputs a list of all regions of uniform reflectance (and also of similar tone mapping intensities and x, y coordinates, if the log chromaticity coordinates were augmented in steps 234 and/or 236). It should be noted that each region of uniform reflectance (Type B token) determined according to the features of the present invention, potentially has significant illumination variation across the region.

U.S. Patent Publication No. US 2010/0142825 teaches a constraint/solver model for segregating illumination and material in an image, including an optimized solution based upon a same material constraint. A same material constraint, as taught in U.S. Patent Publication No. US 2010/0142825, utilizes Type C tokens and Type B tokens, as can be determined according to the teachings of the present invention. The constraining relationship is that all Type C tokens that are part of the same Type B token are constrained to be of the same material. This constraint enforces the definition of a Type B token, that is, a connected image region comprising contiguous pixels that represent a region of the image encompassing a single material (same reflectance) in the scene, though not necessarily the maximal region corresponding to that material. Thus, all Type C tokens that lie within the same Type B token are by the definition imposed upon Type B tokens, of the same material, though not necessarily of the same illumination. The Type C tokens are therefore constrained to correspond to observed differences in appearance that are caused by varying illumination.

Figure 13:
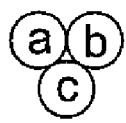
FIG. 13 is a representation of an [A] [x]=[b] matrix relationship used to identify and separate illumination and material aspects of an image, according to a same-material constraint, for generation of intrinsic images.

FIG. 13 is a representation of an [A] [x]=[b] matrix relationship used to identify and separate illumination and material aspects of an image, according to a same-material constraint, as taught in U.S. Patent Publication No. US 2010/0142825. Based upon the basic equation I=ML (I=the recorded image value, as stored in an image file 18, M=material reflectance component of the recorded image color, and L=illumination component of the recorded image color), $\log(I)=\log(ML)=\log(M)+\log(L)$. This can be restated as $I=m+l$, wherein I represents $\log(I)$, m represents $\log(M)$ and l represents $\log(L)$. In the constraining relationship of a same material, in an example where three Type C tokens, a, b and c, (as shown in FIG. 13) are within a region of single reflectance, as defined by a corresponding Type B token defined by a, b and c, then $m_a=m_b=m_c$. For the purpose of this example, the I value for each Type C token is the average color value for the recorded color values of the constituent pixels of the token. The a, b and c, Type C tokens of the example can correspond to the blue Type B token illustrated in FIG. 3d.

Since: $m_a=i_a-l_a$, $m_b=i_b-l_b$, and $m_c=i_c-l_c$, these mathematical relationships can be expressed, in a same material constraint, as $(1)l_a+(-1)l_b+(0)l_c=(i_a-i_b)$, $(1)l_a+(0)l_b+(-1)l_c=(i_a-i_c)$ and $(0)l_a+(1)l_b+(-1)l_c=(i_b-i_c)$.

Thus, in the matrix equation of FIG. 13, the various values for the $\log(I)$ ($i_a$, $i_b$, $i_c$), in the [b] matrix, are known from the average recorded pixel color values for the constituent pixels of the adjacent Type C tokens a, b and c. The [A] matrix of 0's, 1's and −1's, is defined by the set of equations expressing the same material constraint, as described above. The number of rows in the [A] matrix, from top to bottom, corresponds to the number of actual constraints imposed on the tokens, in this case three, the same material constraint between the three adjacent Type C tokens a, b and c. The number of columns in the [A] matrix, from left to right, corresponds to the number of unknowns to be solved for, again, in this case, the three illumination values for the three tokens. Therefore, the values for the illumination components of each Type C token a, b and c, in the [x] matrix, can be solved for in the matrix equation, by the CPU 12. It should be noted that each value is either a vector of three values corresponding to the color bands (such as red, green, and blue) of our example or can be a single value, such as in a grayscale image.

Figure 14:
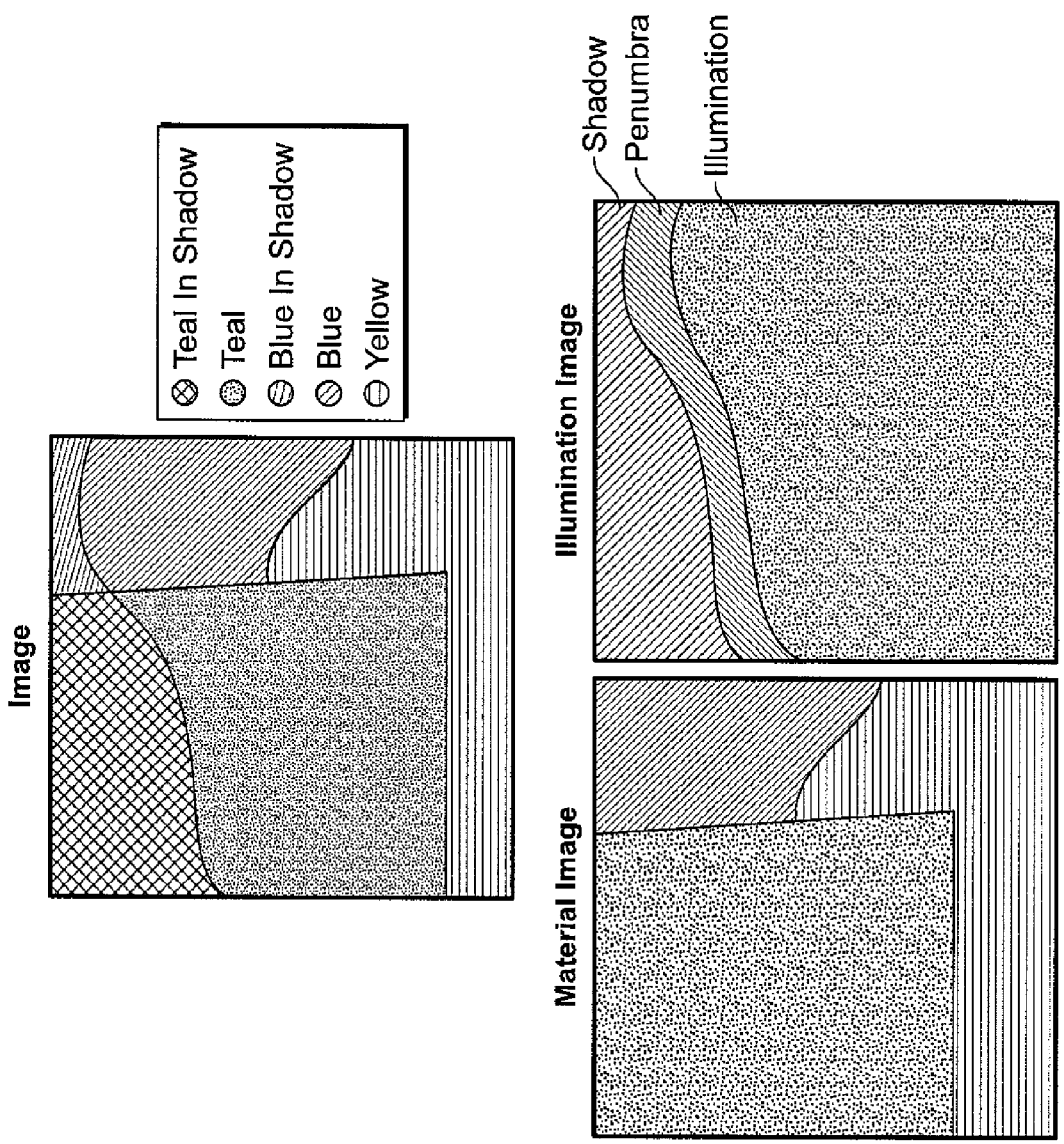
FIG. 14 illustrates intrinsic images including an illumination image and a material image corresponding to the original image of FIG. 3b.

Once the illumination values are known, the material color can be calculated by the CPU 12 using the I=ML equation. Intrinsic illumination and material images can be now be generated for the region defined by tokens a, b and c, by replacing each pixel in the original image by the calculated illumination values and material values, respectively. An example of an illumination image and material image, corresponding to the original image shown in FIG. 3b, is illustrated in FIG. 14.

According to a feature of a further exemplary embodiment of the present invention, the CPU 12 is coupled to an object database 24. As noted above, the object database 24 stores a list of objects that can appear in the image files 18, and information on the material make-up and material reflectance colors for each object stored in the database 24. In connection with the above-described techniques for segregating an image into corresponding material reflectance and illumination intrinsic images, the CPU 12 is operated to perform a known object recognition task, such as, for example, a SIFT technique, to identify objects in an image being processed.

Upon the identification of an object in a scene depicted in an image being processed, the CPU 12 accesses the object database 24 for the material reflectance color information relevant to the identified object. The CPU 12 is then operated to correlate, for example, any Type C tokens in the image being processed that constitute the identified object. The material reflectance color information for the identified object can then be used to specify, for example, a fixed material color anchor value added to the matrix equation shown in FIG. 13, to constrain the Type C tokens constituting the identified object, to thereby segregate the tokens constituting the identified object in an image being processed, into the corresponding intrinsic material reflectance and illumination aspects of the object.

According to yet another feature of the exemplary embodiment, the CPU 12 is coupled to the Internet 26. In this manner, the CPU 12 can access websites 28 on the Internet 26. The websites 28 provide another source for an object database. For example, the CPU 12 can search the Internet 26 via, for example, a text-based search, to obtain information at an accessed website 28, relevant to the material characteristics of an object identified in an image being processed. The material characteristics are used to determine the fixed anchor value described above.

Implementation of the constraint/solver model according to the techniques and teachings of U.S. Patent Publication No. US 2010/0142825, utilizing, for example, the Type C tokens and Type B tokens obtained, for example, via a log chromaticity clustering technique according to the present invention, and information from an object database 26, provides a highly effective and efficient method for generating intrinsic images corresponding to an original input image. The intrinsic images can be used to enhance the accuracy, speed and efficiency of image processing, image analysis and computer vision applications.

Figure 15:
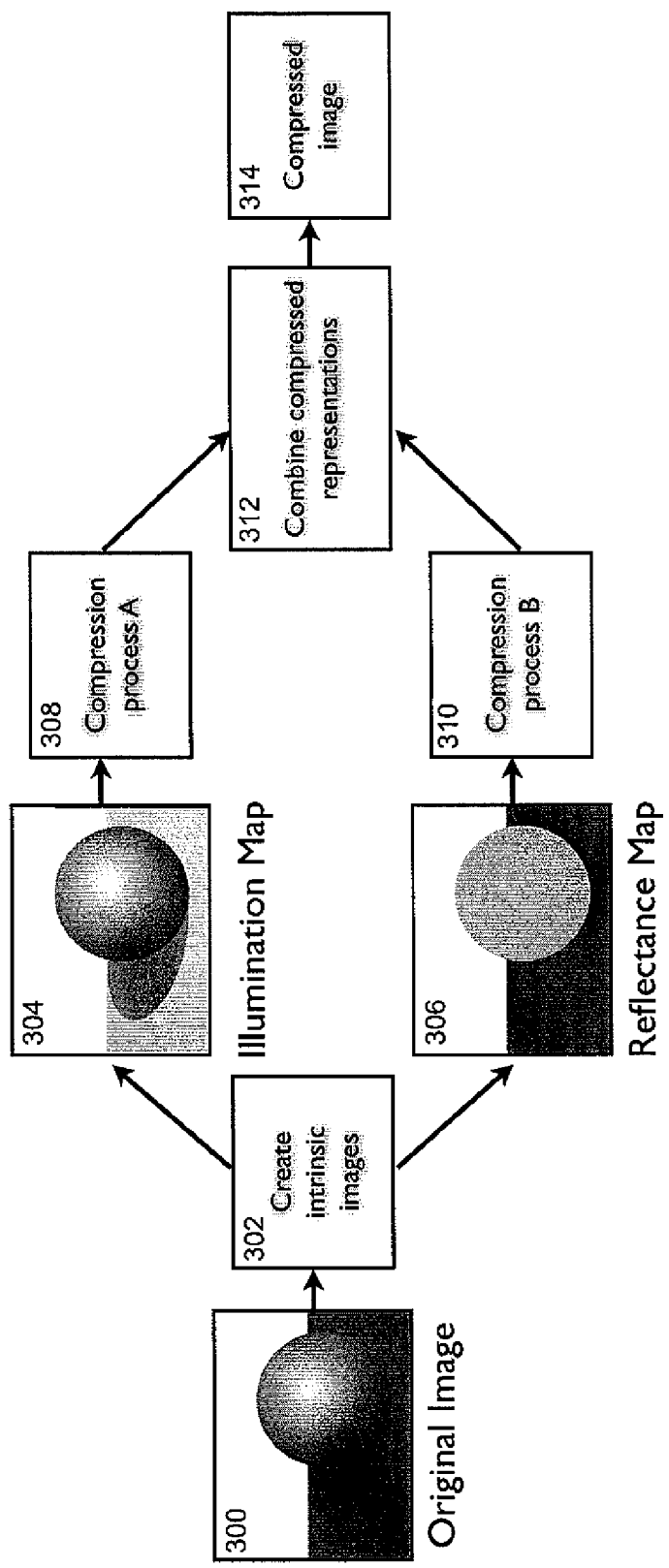
FIG. 15 is a flow chart for compressing an intrinsic image, according to a feature of the present invention.

For example, FIG. 15 shows a flow chart for compressing an intrinsic image, according to a feature of the present invention. Compressing an intrinsic image or set of intrinsic images (material and illumination), rather than an original image, results in a further reduction in the size of the compressed file, for more efficient storage and faster data transmission.

In step 300, the CPU 12 receives an original image, for example, an image file 18 from the memory 16. In step 302, the CPU 12 operates to generate intrinsic images from the original image, for example, according to the techniques described in detail above, to output an illumination map (illumination image) (step 304) and a reflectance map (material image) (step 306).

In steps 308 and 310, the CPU 12 operates to perform, either in a parallel operation, or in a sequence, a compression process A and compression process B, respectively.

In compression process A, the CPU 12 performs a compression process on the illumination image. For example, the CPU 12 operates to convert the illumination map to a .pgm format (a known portable grayscale format). The CPU 12 then proceeds to convert the grayscale illumination .pgm image to a .jpg compressed image file according to the known JPEG format, using quality level 20.

In compression process B, the CPU 12 performs a compression process on the material image. For example, the CPU 12 operates to convert the reflectance map to a GIF file, according to the known Graphics Interchange Format, using 256 colors. The CPU 12 then proceeds to convert the GIF file to a .jpg compressed image file according to the known JPEG format, using quality level 20.

In step 312, the CPU 12 operates to re-mix the .jpg compressed illumination and material compressed files according to a known GNU Image Manipulation Program (GIMP) to output a compressed intrinsic image (step 314).

According to a feature of the present invention, the compressed intrinsic image is stored by the CPU 12 in the memory 16 and/or transmitted, for example, via the Internet 26, to a remote device configured, for example, as a website 28 (see FIG. 1). The remote device comprises, for example, a smartphone, tablet or iPad, or a device in a TV broadcast operation.

Figure 16:
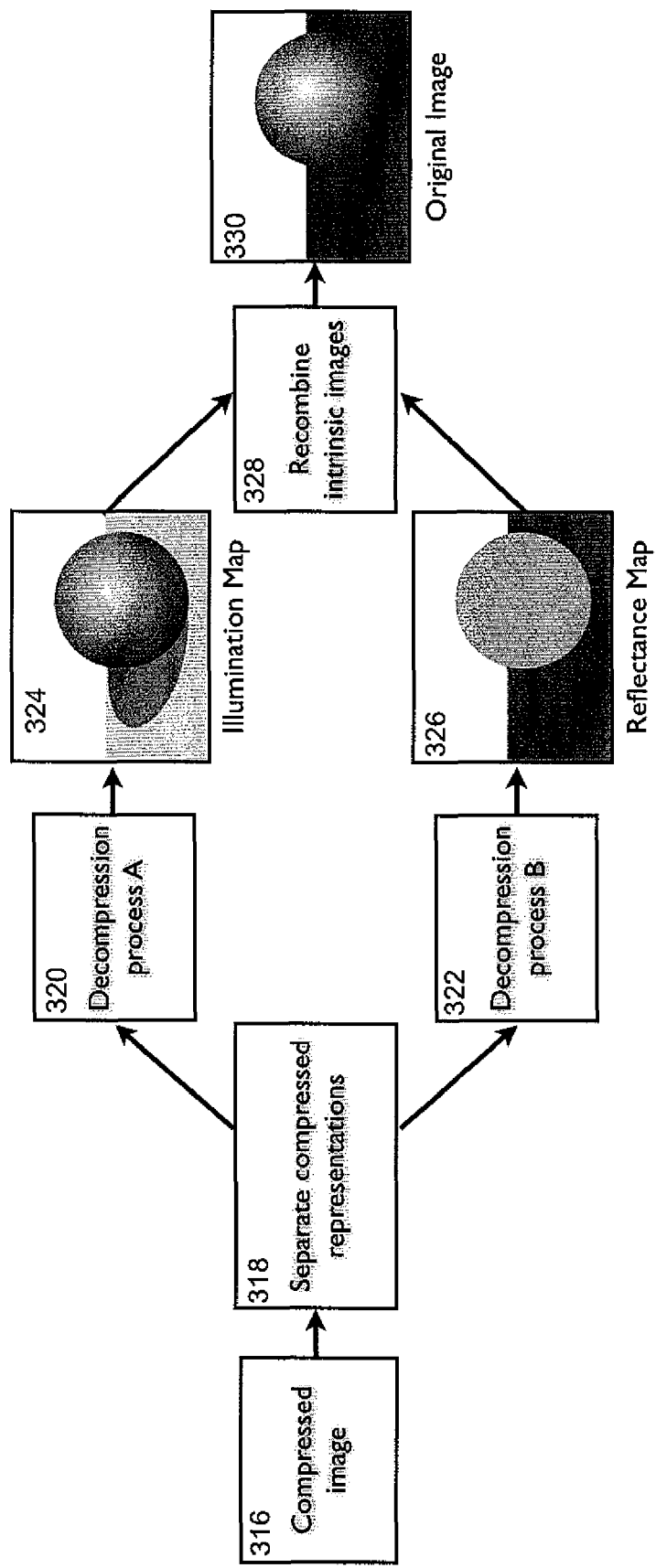
FIG. 16 is a flow chart for decompressing an intrinsic image, according to a feature of the present invention.

FIG. 16 is a flow chart for decompressing an intrinsic image, according to a feature of the present invention. In step 316, a device, for example, configured as a website 28, receives a compressed intrinsic image (processed according to the routine of FIG. 15) via the Internet 26. The device comprises, for example, a smartphone, tablet or iPad, or a device in a TV broadcast operation. In step 318, the CPU 12 (assuming that the receiving device (website 28) is configured as the computer system 10 of FIG. 1) operates to separate the mixed .jpg files comprising the received compressed image, to output the compressed intrinsic illumination and material images.

In steps 320 and 322, the CPU 12 operates to perform, either in a parallel operation, or in a sequence, a decompression process A and decompression process B, respectively.

In decompression process A, the CPU 12 performs a decompression process on the compressed version of the illumination image to output the intrinsic illumination map (step 324).

In decompression process B, the CPU 12 performs a decompression process on the compressed version of the material image to output the intrinsic reflectance map (step 326).

Each of steps 318, 320 and 322 are implemented using known techniques for processing images initially compressed according to known techniques such as the JPEG format.

In step 328, the CPU 12 operates to recombine the intrinsic illumination and material images to output the original image (step 330), for example, the image depicted in the image file 18 initially processed by the CPU 12 according to the routine of FIG. 15. The recombined image can be calculated by the CPU 12 using the I=ML equation, as fully described above.

Figure 17:
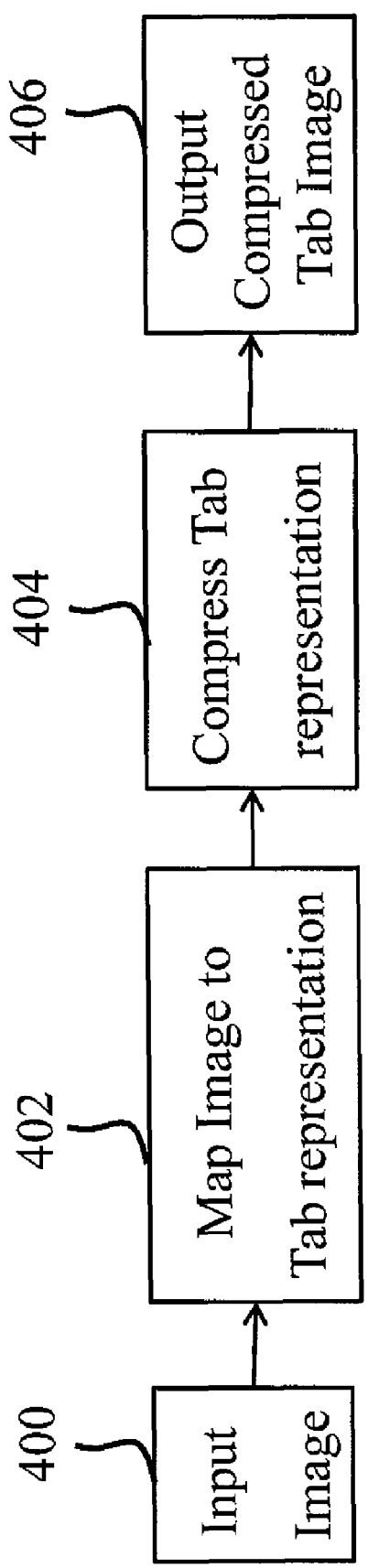
FIG. 17 is a flow chart for a further exemplary embodiment of the present invention using an approximate intrinsic estimate representation of an image as an intrinsic image for use in a data compression technique.

FIG. 17 is a flow chart for a further exemplary embodiment of the present invention, using an approximate intrinsic estimate representation of an image, as an intrinsic image for use in a data compression technique. The approximate intrinsic estimate representation according to a feature of the present invention utilizes illumination invariant log chromaticity plane coordinates and log color space distances to provide an illumination invariant image that represents an estimate of the intrinsic material aspects of an image and corresponds to an original image depicted in an image file 18.

As shown in FIG. 5, a log color value for each pixel in, for example, material C, is projected to an a, b coordinate on the u, v log chromaticity plane. Each pixel can also be designated by a distance T from the log chromaticity plane coordinates a, b for the respective pixel on the log chromaticity plane, to the log color space value for the respective pixel, as shown in the example of FIG. 5. Thus, each pixel of an image can be mapped to a corresponding Tab value.

In step 400, the CPU 12 receives as an input image an image file 18. In step 402, the CPU operates to map the pixels of the image file 18 to corresponding Tab representations for an approximate intrinsic estimate representation of the input image. To that end, the CPU 12 initially performs the routines of FIGS. 6-8 to determine a list of log chromaticity coordinates a, b, for the colors of the pixels of the input image. The CPU 12 co-relates the a, b coordinate values to the respective pixels. The CPU 12 then determines a distance T for each pixel by calculating the log value of the color of each pixel, and then determining a signed Euclidian distance in the log color space for each pixel, from the log color value to the log chromaticity plane, as shown in the example of FIG. 5.

As a result of the a, b coordinate and T distance processing, the CPU 12 can map each pixel of the input image to corresponding T, ab values, to provide the approximate intrinsic estimate representation of the input image. The T, ab values can be scaled. For example, an additive offset can be applied to the values such that maximum or minimum values are correct. A multiplicative scaling can also be applied to insure that the range of T, ab values matches a desired range. Moreover, the T, ab values can be exponentiated such that the T, ab values exist on a linear scale rather than a log scale. These and other scalings can be applied to conform the values to various requirements of industry standard compression techniques.

In step 404, the CPU 12 operates to compress the Tab-based representation of the image. Pursuant to a feature of the present invention, the compression is performed by implementing an industry standard compression technique based upon a Yuv color space, such as, for example, H.264 or mpeg-2. The standard compression technique is implemented replacing a Yuv representation of an image by the Tab representation according to the exemplary embodiment of the present invention.

In the known Yuv color space, the uv values for the pixels of an image include illumination information because color can change with illumination levels. In the Tab mapping according to the exemplary embodiment of the present invention, the a, b coordinates of the log chromaticity plane are illumination invariant. Thus, the compression ratio that can be realized by implementing a technique using the Tab representation is significantly improved.

Figure 18:
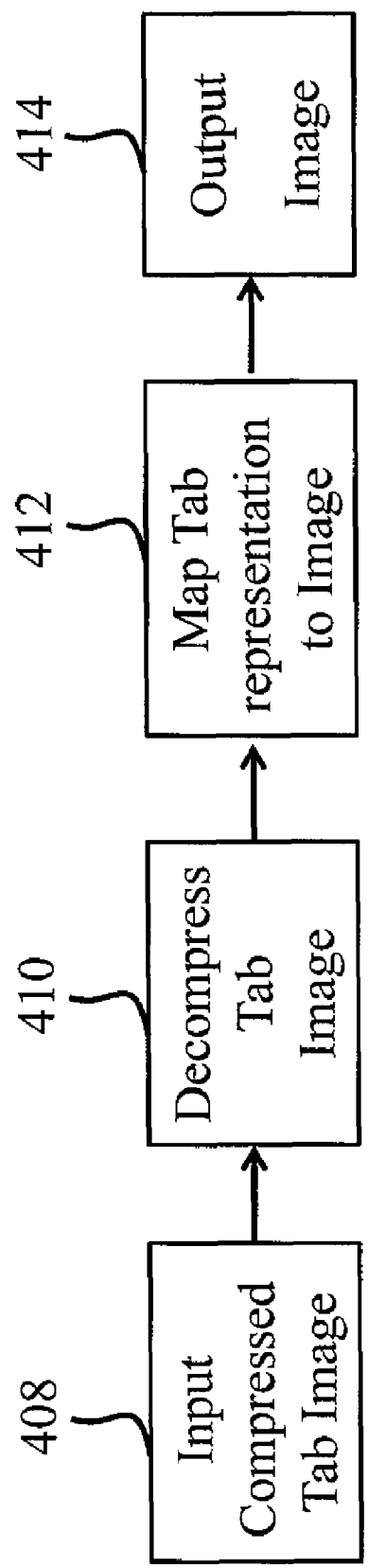
FIG. 18 is a flow chart for decompressing the approximate intrinsic representation determined via execution of the routine of FIG. 17.

FIG. 18 is a flow chart for decompressing the approximate intrinsic representation determined via execution of the routine of FIG. 17. In step 408, a device, for example, configured as a website 28, receives a compressed Tab image (processed according to the routine of FIG. 17) via the Internet 26. The device comprises, for example, as in the previously described exemplary embodiment of the present invention, a smartphone, tablet or iPad, or a device in a TV operation.

In step 410, the device operates to decompress the compressed Tab image. The decoding features of the industry standard used to compress the image can be implemented to achieve the decompression.

In step 412, the device operates to map the Tab image to the RGB representation of the original image file 18. For example, the details of the log color space used by the CPU 12 can be provided to the device, for use in mapping the T distance and a, b coordinates values back to the log RGB color values. To that end, the N value for the orientation of the log chromaticity plane (see FIG. 5) can be transmitted with the T, ab representation of the image.

In step 414, the device outputs the original image.

Due to the rapidly increasing number of users of devices for reception and realtime display of digital images and videos, the improvement in compression results realized via the use of intrinsic images, as taught by the present invention, extends the limits of effective functionality, to thereby accommodate the modern trends in electronic device usage.

In the preceding specification, the invention has been described with reference to specific exemplary embodiments and examples thereof. It will, however, be evident that various modifications and changes may be made thereto without departing from the broader spirit and scope of the invention as set forth in the claims that follow. The specification and drawings are accordingly to be regarded in an illustrative manner rather than a restrictive sense.

What is claimed is:

1. An automated, computerized method for processing an image, comprising the steps of:
providing an image file depicting an image, in a computer memory;
generating an approximate intrinsic material and illumination component estimate representation of the image as an intrinsic image corresponding to the image, wherein the approximate intrinsic material and illumination component estimate representation of the image comprises an illumination invariant log chromaticity plane coordinate in a log color space and log color space distance representation including a Tab representation for each pixel of the image, wherein T is a log color space distance from a log color value for each pixel to a log chromaticity plane and ab are coordinates in the log chromaticity plane in the log color space and compressing the intrinsic image to provide a compressed intrinsic image.

2. The method of claim 1 including the additional step of transmitting the compressed intrinsic image to a remote device.

3. The method of claim 1 including the additional step of storing the compressed intrinsic image in a memory.

4. A device, comprising:
a computer system arranged and configured to execute a routine to access an image file depicting an image, in a computer memory, generate an approximate intrinsic material and illumination component estimate representation of the image as an intrinsic image corresponding to the image, wherein the approximate intrinsic material and illumination component estimate representation of the image comprises an illumination invariant log chromaticity plane coordinate in a log color space and log color space distance representation including a Tab representation for each pixel of the image, wherein T is a log color space distance from a log color value for each pixel to a log chromaticity plane and ab are coordinates in the log chromaticity plane in the log color space, compress the intrinsic image to provide a compressed intrinsic image, and output the compressed intrinsic image.

5. A computer program product, disposed on a non-transitory computer readable media, the product including computer executable process steps operable to control a computer to: access an image file depicting an image, in a computer memory, generate an approximate intrinsic material and illumination component estimate representation of the image as an intrinsic image corresponding to the image, wherein the approximate intrinsic material and illumination component estimate representation of the image comprises an illumination invariant log chromaticity plane coordinate in a log color space and log color space distance representation including a Tab representation for each pixel of the image, wherein T is a log color space distance from a log color value for each pixel to a log chromaticity plane and ab are coordinates in the log chromaticity plane in the log color space, compress the intrinsic image to provide a compressed intrinsic image, and output the compressed intrinsic image.

6. A device, comprising:

a computer system arranged and configured to receive a compressed intrinsic image and to decompress the compressed intrinsic image to an approximate intrinsic material and illumination component estimate representation of the image, wherein the approximate intrinsic material and illumination component estimate representation of the image comprises an illumination invariant log chromaticity plane coordinate in a log color space and log color space distance representation including a Tab representation for each pixel of the image, wherein T is a log color space distance from a log color value for each pixel to a log chromaticity plane and ab are coordinates in the log chromaticity plane in the log color space.

* * * * *